United States Patent
Petruzzelli et al.

(10) Patent No.: US 9,961,401 B2
(45) Date of Patent: May 1, 2018

(54) MEDIA CONTENT CROWDSOURCE

(71) Applicant: DISH Technologies L.L.C., Englewood, CO (US)

(72) Inventors: Edmund Petruzzelli, Centennial, CO (US); David Kummer, Highlands Ranch, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days. days.

(21) Appl. No.: 15/389,859

(22) Filed: Dec. 23, 2016

(65) Prior Publication Data

US 2017/0111696 A1   Apr. 20, 2017

Related U.S. Application Data

(63) Continuation of application No. 14/494,079, filed on Sep. 23, 2014, now Pat. No. 9,565,474.

(51) Int. Cl.
| | |
|---|---|
| *H04N 21/2385* | (2011.01) |
| *H04N 21/4147* | (2011.01) |
| *H04N 21/4627* | (2011.01) |
| *H04N 21/462* | (2011.01) |
| *H04N 21/426* | (2011.01) |

(Continued)

(52) U.S. Cl.
CPC ..... *H04N 21/4622* (2013.01); *H04N 21/2385* (2013.01); *H04N 21/4147* (2013.01); *H04N 21/4263* (2013.01); *H04N 21/4334* (2013.01); *H04N 21/4627* (2013.01); *H04N 21/6112* (2013.01); *H04N 21/6143* (2013.01); *H04N 21/6162* (2013.01); *H04N 21/6193* (2013.01);

(Continued)

(58) Field of Classification Search
CPC ........... H04N 21/4622; H04N 21/2385; H04N 21/4147; H04N 21/4263; H04N 21/4334; H04N 21/4627; H04N 21/6112; H04N 21/6143; H04N 21/6162; H04N 21/6193; H04N 21/632; H04N 21/64707
USPC ........................................................ 725/23
See application file for complete search history.

(56) References Cited

U.S. PATENT DOCUMENTS

| 6,005,562 A | 12/1999 | Shiga et al. |
| 6,177,931 B1 | 1/2001 | Alexander et al. |

(Continued)

FOREIGN PATENT DOCUMENTS

| EP | 1 865 716 A2 | 12/2007 |
| EP | 2 309 733 B1 | 4/2011 |

(Continued)

OTHER PUBLICATIONS

Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09.021.

(Continued)

*Primary Examiner* — Nathan Flynn
*Assistant Examiner* — Caroline Somera
(74) *Attorney, Agent, or Firm* — Kilpatrick Townsend & Stockton LLP

(57) ABSTRACT

The provisioning of media content to computing devices that might not normally have access thereto. Example types of media or media content may include advertising media, broadcast media, social media, news media, and others.

16 Claims, 9 Drawing Sheets

(51) Int. Cl.
  *H04N 21/433* (2011.01)
  *H04N 21/61* (2011.01)
  *H04N 21/63* (2011.01)
  *H04N 21/647* (2011.01)
(52) U.S. Cl.
  CPC ..... *H04N 21/632* (2013.01); *H04N 21/64707* (2013.01)

(56) References Cited

U.S. PATENT DOCUMENTS

| | | | |
|---|---|---|---|
| 6,681,396 | B1 | 1/2004 | Bates et al. |
| 6,774,924 | B2 | 8/2004 | Kato et al. |
| 7,174,512 | B2 | 2/2007 | Martin et al. |
| 7,197,715 | B1 | 3/2007 | Valeria |
| 7,633,887 | B2 | 12/2009 | Panwar et al. |
| 7,680,894 | B2 | 3/2010 | Diot et al. |
| 7,774,811 | B2 | 8/2010 | Poslinski et al. |
| 7,818,368 | B2 | 10/2010 | Yang et al. |
| 7,825,989 | B1 | 11/2010 | Greenberg |
| 7,849,487 | B1 | 12/2010 | Vosseller |
| 8,024,753 | B1 | 9/2011 | Kummer et al. |
| 8,046,798 | B1 | 10/2011 | Schlack et al. |
| 8,079,052 | B2 | 12/2011 | Chen et al. |
| 8,104,065 | B2 | 1/2012 | Aaby et al. |
| 8,209,713 | B1 | 6/2012 | Lai et al. |
| 8,296,797 | B2 | 10/2012 | Olstad et al. |
| 8,312,486 | B1 | 11/2012 | Briggs et al. |
| 8,424,041 | B2 | 4/2013 | Candelore et al. |
| 8,427,356 | B1 | 4/2013 | Satish |
| 8,627,349 | B2 | 1/2014 | Kirby et al. |
| 8,667,527 | B2 | 3/2014 | Yan et al. |
| 8,689,258 | B2 | 4/2014 | Kemp |
| 8,752,084 | B1 | 6/2014 | Lai et al. |
| 8,855,681 | B1 | 10/2014 | George et al. |
| 8,973,038 | B2 | 3/2015 | Gratton |
| 8,973,068 | B2 | 3/2015 | Kotecha et al. |
| 8,990,418 | B1 | 3/2015 | Bragg et al. |
| 9,038,127 | B2 | 5/2015 | Hastings et al. |
| 9,066,156 | B2 | 6/2015 | Kapa |
| 9,213,986 | B1 | 12/2015 | Buchheit et al. |
| 9,253,533 | B1 | 2/2016 | Morgan et al. |
| 9,264,779 | B2 | 2/2016 | Kirby et al. |
| 9,288,551 | B2 | 3/2016 | Kummer |
| 9,420,333 | B2 | 8/2016 | Martch et al. |
| 9,426,516 | B2 | 8/2016 | Kemp |
| 9,565,474 | B2 | 2/2017 | Petruzzelli et al. |
| 9,602,875 | B2 | 3/2017 | Hussain |
| 9,609,379 | B2 | 3/2017 | Martch et al. |
| 9,621,960 | B2 | 4/2017 | Hardy et al. |
| 9,681,176 | B2 | 6/2017 | Mountain |
| 9,769,540 | B2 | 9/2017 | Kummer |
| 2001/0013123 | A1 | 8/2001 | Freeman et al. |
| 2001/0026609 | A1 | 10/2001 | Weinstein et al. |
| 2002/0059610 | A1 | 5/2002 | Ellis |
| 2002/0067376 | A1 | 6/2002 | Martin et al. |
| 2002/0075402 | A1 | 6/2002 | Robson et al. |
| 2002/0090198 | A1 | 7/2002 | Rosenberg et al. |
| 2002/0164155 | A1 | 11/2002 | Mate |
| 2002/0166122 | A1 | 11/2002 | Kikinis et al. |
| 2002/0174430 | A1 | 11/2002 | Ellis et al. |
| 2002/0178444 | A1 | 11/2002 | Trajkovic et al. |
| 2003/0023742 | A1 | 1/2003 | Allen et al. |
| 2003/0056220 | A1 | 3/2003 | Thornton et al. |
| 2003/0066076 | A1* | 4/2003 | Minahan .............. G06F 21/10 725/29 |
| 2003/0066077 | A1 | 4/2003 | Gutta et al. |
| 2003/0118014 | A1 | 6/2003 | Iyer et al. |
| 2003/0126605 | A1 | 7/2003 | Betz et al. |
| 2003/0126606 | A1 | 7/2003 | Buczak et al. |
| 2003/0154475 | A1 | 8/2003 | Rodriguez et al. |
| 2003/0154485 | A1 | 8/2003 | Johnson et al. |
| 2003/0172376 | A1 | 9/2003 | Coffin, III |
| 2003/0188317 | A1 | 10/2003 | Liew et al. |
| 2003/0189674 | A1 | 10/2003 | Inoue et al. |
| 2003/0208763 | A1 | 11/2003 | McElhatten et al. |
| 2003/0229899 | A1 | 12/2003 | Thompson et al. |
| 2004/0181807 | A1 | 9/2004 | Theiste et al. |
| 2005/0030977 | A1 | 2/2005 | Casey et al. |
| 2005/0044570 | A1 | 2/2005 | Poslinski |
| 2005/0071865 | A1 | 3/2005 | Martins |
| 2005/0091690 | A1 | 4/2005 | Delpuch et al. |
| 2005/0125302 | A1 | 6/2005 | Brown et al. |
| 2005/0152565 | A1 | 7/2005 | Jouppi et al. |
| 2005/0166230 | A1 | 7/2005 | Gaydou et al. |
| 2005/0180568 | A1 | 8/2005 | Krause |
| 2005/0191041 | A1 | 9/2005 | Braun et al. |
| 2005/0240961 | A1 | 10/2005 | Jerding et al. |
| 2005/0264705 | A1 | 12/2005 | Kitamura |
| 2005/0275758 | A1 | 12/2005 | McEvilly et al. |
| 2006/0020962 | A1 | 1/2006 | Stark et al. |
| 2006/0085828 | A1 | 4/2006 | Dureau et al. |
| 2006/0089870 | A1 | 4/2006 | Myhr |
| 2006/0174277 | A1 | 8/2006 | Sezan et al. |
| 2006/0190615 | A1 | 8/2006 | Panwar et al. |
| 2006/0238656 | A1 | 10/2006 | Chen et al. |
| 2006/0253581 | A1 | 11/2006 | Dixon et al. |
| 2006/0282852 | A1 | 12/2006 | Purpura et al. |
| 2006/0282869 | A1 | 12/2006 | Plourde |
| 2007/0033616 | A1 | 2/2007 | Gutta |
| 2007/0058930 | A1 | 3/2007 | Iwamoto |
| 2007/0074256 | A1 | 3/2007 | Jung et al. |
| 2007/0079342 | A1* | 4/2007 | Ellis .............. H04N 5/913 725/89 |
| 2007/0083901 | A1 | 4/2007 | Bond |
| 2007/0127894 | A1 | 6/2007 | Ando et al. |
| 2007/0146554 | A1 | 6/2007 | Strickland et al. |
| 2007/0154163 | A1 | 7/2007 | Cordray |
| 2007/0154169 | A1 | 7/2007 | Cordray et al. |
| 2007/0157235 | A1 | 7/2007 | Teunissen |
| 2007/0157249 | A1 | 7/2007 | Cordray et al. |
| 2007/0157253 | A1 | 7/2007 | Ellis et al. |
| 2007/0157281 | A1* | 7/2007 | Ellis .............. H04N 7/17309 725/134 |
| 2007/0169165 | A1 | 7/2007 | Crull et al. |
| 2007/0188655 | A1 | 8/2007 | Ohta |
| 2007/0199040 | A1 | 8/2007 | Kates |
| 2007/0204302 | A1 | 8/2007 | Calzone |
| 2007/0226766 | A1 | 9/2007 | Poslinski et al. |
| 2007/0245379 | A1 | 10/2007 | Agnihortri |
| 2007/0288951 | A1 | 12/2007 | Ray et al. |
| 2008/0022012 | A1 | 1/2008 | Wang |
| 2008/0060006 | A1 | 3/2008 | Shanks et al. |
| 2008/0086743 | A1 | 4/2008 | Cheng et al. |
| 2008/0097949 | A1 | 4/2008 | Kelly et al. |
| 2008/0109307 | A1 | 5/2008 | Ullah |
| 2008/0134043 | A1 | 6/2008 | Georgis et al. |
| 2008/0163305 | A1 | 7/2008 | Johnson et al. |
| 2008/0195457 | A1 | 8/2008 | Sherman et al. |
| 2008/0235348 | A1 | 9/2008 | Dasgupta |
| 2008/0239169 | A1 | 10/2008 | Moon et al. |
| 2008/0244666 | A1 | 10/2008 | Moon et al. |
| 2008/0244678 | A1 | 10/2008 | Kim et al. |
| 2008/0270038 | A1 | 10/2008 | Partovi et al. |
| 2008/0282312 | A1 | 11/2008 | Blinnikka |
| 2008/0300982 | A1 | 12/2008 | Larson et al. |
| 2008/0305832 | A1 | 12/2008 | Greenberg |
| 2008/0320523 | A1 | 12/2008 | Morris et al. |
| 2009/0044217 | A1 | 2/2009 | Lutterbach et al. |
| 2009/0055385 | A1 | 2/2009 | Jeon et al. |
| 2009/0102984 | A1 | 4/2009 | Arling et al. |
| 2009/0138902 | A1 | 5/2009 | Kamen |
| 2009/0150941 | A1 | 6/2009 | Riedl et al. |
| 2009/0178071 | A1 | 7/2009 | Whitehead |
| 2009/0210898 | A1 | 8/2009 | Childress et al. |
| 2009/0217332 | A1* | 8/2009 | Hindle .............. H04N 5/782 725/109 |
| 2009/0228911 | A1 | 9/2009 | Vrijsen |
| 2009/0234828 | A1 | 9/2009 | Tu |
| 2009/0249412 | A1 | 10/2009 | Bhogal et al. |
| 2009/0276803 | A1 | 11/2009 | Weaver |
| 2009/0282445 | A1 | 11/2009 | Yang et al. |
| 2009/0293093 | A1 | 11/2009 | Igarashi |
| 2009/0299824 | A1 | 12/2009 | Barnes, Jr. |

(56) References Cited

U.S. PATENT DOCUMENTS

| | | |
|---|---|---|
| 2009/0325523 A1 | 12/2009 | Choi |
| 2010/0031306 A1 | 2/2010 | Pandey et al. |
| 2010/0040151 A1 | 2/2010 | Garrett |
| 2010/0064306 A1 | 3/2010 | Tiongson et al. |
| 2010/0071007 A1 | 3/2010 | Meijer |
| 2010/0071062 A1 | 3/2010 | Choyi et al. |
| 2010/0083327 A1* | 4/2010 | Toba ............... H04L 61/106 725/109 |
| 2010/0089996 A1 | 4/2010 | Koplar |
| 2010/0115554 A1 | 5/2010 | Drouet et al. |
| 2010/0122294 A1 | 5/2010 | Craner |
| 2010/0125864 A1 | 5/2010 | Dwyer et al. |
| 2010/0146560 A1 | 6/2010 | Bonfrer |
| 2010/0153983 A1 | 6/2010 | Philmon et al. |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0262986 A1 | 10/2010 | Adimatyam et al. |
| 2010/0269144 A1 | 10/2010 | Forsman et al. |
| 2010/0272257 A1 | 10/2010 | Beals |
| 2010/0305729 A1 | 12/2010 | Glitsch et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Morita |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0082858 A1 | 4/2011 | Yu et al. |
| 2011/0109801 A1 | 5/2011 | Thomas et al. |
| 2011/0173337 A1 | 7/2011 | Walsh et al. |
| 2011/0202956 A1 | 8/2011 | Connelly et al. |
| 2011/0206342 A1 | 8/2011 | Thompson et al. |
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2011/0295667 A1 | 12/2011 | Butler |
| 2012/0020641 A1 | 1/2012 | Sakaniwa et al. |
| 2012/0052941 A1 | 3/2012 | Mo |
| 2012/0060178 A1 | 3/2012 | Minakuchi et al. |
| 2012/0066722 A1 | 3/2012 | Cheung et al. |
| 2012/0106932 A1 | 5/2012 | Grevers, Jr. |
| 2012/0110615 A1 | 5/2012 | Kilar et al. |
| 2012/0110616 A1 | 5/2012 | Kilar et al. |
| 2012/0124625 A1 | 5/2012 | Foote et al. |
| 2012/0131613 A1 | 5/2012 | Ellis et al. |
| 2012/0185895 A1 | 7/2012 | Wong et al. |
| 2012/0204209 A1 | 8/2012 | Kubo |
| 2012/0230651 A1 | 9/2012 | Chen |
| 2012/0246672 A1 | 9/2012 | Sridhar et al. |
| 2012/0260295 A1 | 10/2012 | Rondeau |
| 2012/0278834 A1 | 11/2012 | Richardson |
| 2012/0278837 A1 | 11/2012 | Curtis et al. |
| 2012/0284745 A1 | 11/2012 | Strong |
| 2012/0295560 A1 | 11/2012 | Mufti |
| 2012/0311633 A1 | 12/2012 | Mandrekar et al. |
| 2013/0014159 A1 | 1/2013 | Wiser et al. |
| 2013/0031216 A1 | 1/2013 | Willis et al. |
| 2013/0042280 A1* | 2/2013 | Chen ............... H04N 21/44209 725/68 |
| 2013/0055304 A1 | 2/2013 | Kirby et al. |
| 2013/0061313 A1 | 3/2013 | Cullimore et al. |
| 2013/0071090 A1 | 3/2013 | Berkowitz et al. |
| 2013/0074109 A1 | 3/2013 | Skelton et al. |
| 2013/0114940 A1 | 5/2013 | Merzon et al. |
| 2013/0128119 A1 | 5/2013 | Madathodiyil et al. |
| 2013/0145023 A1 | 6/2013 | Li et al. |
| 2013/0174196 A1 | 7/2013 | Herlein |
| 2013/0194503 A1 | 8/2013 | Yamashita |
| 2013/0232148 A1 | 9/2013 | MacDonald et al. |
| 2013/0243398 A1* | 9/2013 | Templeman ............ H04N 5/782 386/293 |
| 2013/0263189 A1 | 10/2013 | Garner |
| 2013/0268951 A1 | 10/2013 | Wyatt et al. |
| 2013/0283162 A1 | 10/2013 | Aronsson et al. |
| 2013/0291037 A1 | 10/2013 | Im et al. |
| 2013/0298151 A1 | 11/2013 | Leske et al. |
| 2013/0332962 A1 | 12/2013 | Moritz et al. |
| 2013/0346302 A1 | 12/2013 | Purves et al. |
| 2014/0032709 A1 | 1/2014 | Saussy et al. |
| 2014/0067998 A1 | 3/2014 | Garcia et al. |
| 2014/0068675 A1 | 3/2014 | Mountain |
| 2014/0068692 A1 | 3/2014 | Archibong et al. |
| 2014/0114966 A1 | 4/2014 | Bilinski et al. |
| 2014/0123160 A1 | 5/2014 | Van Coppenolle et al. |
| 2014/0139555 A1 | 5/2014 | Levy |
| 2014/0140680 A1 | 5/2014 | Jo |
| 2014/0150009 A1 | 5/2014 | Sharma |
| 2014/0153904 A1 | 6/2014 | Adimatyam et al. |
| 2014/0157327 A1 | 6/2014 | Roberts et al. |
| 2014/0215539 A1 | 7/2014 | Chen et al. |
| 2014/0247931 A1 | 9/2014 | Swamy et al. |
| 2014/0282714 A1 | 9/2014 | Hussain |
| 2014/0282741 A1 | 9/2014 | Shoykhet |
| 2014/0282744 A1 | 9/2014 | Hardy et al. |
| 2014/0282745 A1 | 9/2014 | Chipman et al. |
| 2014/0282759 A1 | 9/2014 | Harvey et al. |
| 2014/0282779 A1 | 9/2014 | Navarro |
| 2014/0294201 A1 | 10/2014 | Johnson et al. |
| 2014/0310819 A1 | 10/2014 | Cakarel et al. |
| 2014/0313341 A1 | 10/2014 | Stribling |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0020097 A1 | 1/2015 | Freed et al. |
| 2015/0040176 A1 | 2/2015 | Hybertson et al. |
| 2015/0052568 A1 | 2/2015 | Glennon et al. |
| 2015/0058890 A1 | 2/2015 | Kapa |
| 2015/0095932 A1 | 4/2015 | Ren |
| 2015/0118992 A1 | 4/2015 | Wyatt et al. |
| 2015/0150052 A1 | 5/2015 | Errico et al. |
| 2015/0181132 A1 | 6/2015 | Kummer et al. |
| 2015/0181279 A1 | 6/2015 | Martch et al. |
| 2015/0229981 A1 | 8/2015 | Williams et al. |
| 2015/0249803 A1 | 9/2015 | Tozer et al. |
| 2015/0249864 A1 | 9/2015 | Tang et al. |
| 2015/0310725 A1 | 10/2015 | Koskan et al. |
| 2015/0334461 A1 | 11/2015 | Yu |
| 2016/0066020 A1 | 3/2016 | Mountain |
| 2016/0066026 A1 | 3/2016 | Mountain |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli et al. |
| 2016/0191147 A1 | 6/2016 | Martch |
| 2016/0198229 A1 | 7/2016 | Keipert |
| 2016/0309212 A1 | 10/2016 | Martch et al. |
| 2016/0360275 A1 | 12/2016 | Kemp |

FOREIGN PATENT DOCUMENTS

| | | |
|---|---|---|
| EP | 2 403 239 A1 | 1/2012 |
| FR | 2 902 568 A1 | 12/2007 |
| JP | H10 322622 A | 12/1998 |
| JP | 2006-245745 A | 9/2006 |
| KR | 2004 0025073 A | 3/2004 |
| KR | 2006 0128295 A | 12/2006 |
| WO | 98/37694 A1 | 8/1998 |
| WO | 2005/059807 A2 | 6/2005 |
| WO | 2007/064987 A2 | 7/2007 |
| WO | 2007/098067 A1 | 8/2007 |
| WO | 2009/073925 A1 | 6/2009 |
| WO | 2011/040999 A1 | 4/2011 |
| WO | 2013/016626 A1 | 1/2013 |
| WO | 2014/072742 A1 | 5/2014 |

(56) References Cited

FOREIGN PATENT DOCUMENTS

| WO | 2014/164782 A1 | 10/2014 |
|---|---|---|
| WO | 2014/179017 A1 | 11/2014 |
| WO | 2016/030384 | 3/2016 |
| WO | 2016/030477 A1 | 3/2016 |
| WO | 2016/034899 A1 | 3/2016 |
| WO | 2016/055761 A1 | 4/2016 |

OTHER PUBLICATIONS

Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.
Extended European Search Report for EP 14160140.1 dated Jul. 7, 2014, 7 pages.
Office Action for EP 14160140.1 dated Jan. 19, 2016, 5 pages.
European Search Report for EP 14197940.1 dated Apr. 28, 2015, 13 pages.
International Search Report and Written Opinion for PCT/US2014/023466 dated Jul. 10, 2014, 15 pages.
International Preliminary Report on Patentability for PCT/US2014/023466 dated Sep. 15, 2015, 8 pages.
International Search Report and Written Opinion for PCT/EP2015/069461 dated Oct. 1, 2015, 13 pages.
International Search Report and Written Opinion for PCT/EP2015/069456 dated Oct. 5, 2015, all pages.
International Search Report and Written Opinion of PCT/US2014/033796 dated Sep. 5, 2014, 12 pages.
International Preliminary Report on Patentability for PCT/US2014/033796 dated Nov. 3, 2015, all pages.
International Search Report and Written Opinion for PCT/EP2015/069681 dated Nov. 23, 2015, 12 pages.
International Search Report and Written Opinion for PCT/GB2015/052570 dated Dec. 11, 2015, 13 pages.
International Search Report and Written Opinion for PCT/GB2015/052456 dated Jun. 13, 2016, all pages.
U.S. Appl. No. 13/801,932, filed Mar. 13, 2013 Non Final Office Action dated Jun. 24, 2015, 21 pages.
U.S. Appl. No. 13/801,932, filed Mar. 13, 2013 Final Office Action dated Dec. 17, 2015, 23 pages.
U.S. Appl. No. 13/801,932, filed Mar. 13, 2013 Non-Final Rejection dated May 20, 2016, 28 pages.
U.S. Appl. No. 13/801,932, filed Mar. 13, 2013 Notice of Allowance dated Nov. 25, 2016, all pages.
U.S. Appl. No. 13/834,916, filed Mar. 15, 2013 Non Final Office Action dated Aug. 8, 2014, 19 pages.
U.S. Appl. No. 13/834,916, filed Mar. 15, 2013 Final Office Action dated Jan. 12, 2015, 22 pages.
U.S. Appl. No. 13/834,916, filed Mar. 15, 2013 Non Final Office Action dated Apr. 27, 2015, 22 pages.
U.S. Appl. No. 13/834,916, filed Mar. 15, 2013 Final Office Action dated Dec. 14, 2015, 31 pages.
U.S. Appl. No. 13/834,916, filed Mar. 15, 2013 Non-Final Rejection dated Aug. 18, 2016, all pages.
U.S. Appl. No. 13/834,916, filed Mar. 15, 2013 Final Office Action dated Mar. 13, 2017, all pages.
U.S. Appl. No. 14/297,322, filed Jun. 5, 2014 Notice of Allowance dated Nov. 5, 2015, 34 pages.
U.S. Appl. No. 14/297,279, filed Jun. 5, 2014 Non-Final Office Action dated Nov. 5, 2015, 45 pages.
U.S. Appl. No. 14/297,279, filed Jun. 5, 2014 Final Rejection dated Apr. 22, 2016, 33 pages.
U.S. Appl. No. 14/297,279, filed Jun. 5, 2014 Non-Final Office Action dated Feb. 9, 2017, all pages.
U.S. Appl. No. 14/200,864, filed Mar. 7, 2014 Non-Final Office Action dated Dec. 5, 2014, 35 pages.
U.S. Appl. No. 14/200,864, filed Mar. 7, 2014 Final Office Action dated Jun. 18, 2015, 36 pages.
U.S. Appl. No. 14/200,864, filed Mar. 7, 2014 Non-Final Office Action dated Feb. 18, 2016, 61 pages.
U.S. Appl. No. 14/200,864, filed Mar. 7, 2014 Notice of Allowance dated Sep. 15, 2016, all pages.
U.S. Appl. No. 13/886,873, filed May 3, 2013, Notice of Allowance dated Oct. 24, 2014, 40 pages.
U.S. Appl. No. 14/470,248, filed Aug. 27, 2014, Preinterview first office action dated Sep. 4, 2015, 22 pages.
U.S. Appl. No. 14/470,248, filed Aug. 27, 2014, Final Office Action dated Feb. 16, 2016, 26 pages.
U.S. Appl. No. 14/470,248, filed Aug. 27, 2014, Non Final Office Action dated Jul. 25, 2016, all pages.
U.S. Appl. No. 14/470,248, filed Aug. 27, 2014, Final Office Action dated Dec. 9, 2016, all pages.
U.S. Appl. No. 14/470,279, filed Aug. 27, 2014, Preinterview first office action dated Aug. 26, 2015, 23 pages.
U.S. Appl. No. 14/470,279, filed Aug. 27, 2014, Final Office Action dated Jan. 22, 2016, 25 pages.
U.S. Appl. No. 14/470,279, filed Aug. 27, 2014, Non Final Office Action dated Jul. 19, 2016, all pages.
U.S. Appl. No. 14/470,279, filed Aug. 27, 2014, Final Office Action dated Dec. 9, 2016, all pages.
U.S. Appl. No. 14/470,279, filed Aug. 27, 2014, Notice of Allowance dated Mar. 16, 2017, all pages.
U.S. Appl. No. 14/479,007, filed Sep. 5, 2014, Final Office Action dated Jan. 23, 2017, all pages.
U.S. Appl. No. 14/479,007, filed Sep. 5, 2014, Non-Final Office Action dated Sep. 1, 2015, 44 pages.
U.S. Appl. No. 14/479,007, filed Sep. 5, 2014, Final Office Action dated Feb. 22, 2016, 37 pages.
U.S. Appl. No. 14/479,007, filed Sep. 5, 2014, Non-Final Office Action dated Jul. 27, 2016, 37 pages.
U.S. Appl. No. 14/591,474, filed Jan. 7, 2015, Non-Final Office Action dated Feb. 12, 2016, 32 pages.
U.S. Appl. No. 14/591,474, filed Jan. 7, 2015, Non-Final Office Action dated Dec. 16, 2016, 32 pages.
U.S. Appl. No. 14/494,079, filed Sep. 23, 2014, Preinterview first office action dated Feb. 10, 2016, 6 pages.
U.S. Appl. No. 15/195,527, filed Jun. 28, 2016, Non-Final Rejection dated Sep. 30, 2016, all pages.
U.S. Appl. No. 15/195,527, filed Jun. 28, 2016, Notice of Allowance dated Feb. 3, 2017, all pages.
Extended European Search Report for EP 11166892.7 dated Oct. 6, 2011, 7 pages.
U.S. Appl. No. 13/942,451, filed Jul. 15, 2013 Final Office Action dated Apr. 30, 2015, 33 pages.
U.S. Appl. No. 13/942,451, filed Jul. 15, 2013 Non Final Office Action dated Jul. 28, 2014, 27 pages.
U.S. Appl. No. 13/942,451, filed Jul. 15, 2013 Non Final Office Action dated Jan. 8, 2016, 41 pages.
U.S. Appl. No. 13/942,451, filed Jul. 15, 2013 Final Office Action dated Jun. 22, 2016, all pages.
U.S. Appl. No. 13/942,451, filed Jul. 15, 2013 Non Final Office Action dated Oct. 25, 2016, all pages.
U.S. Appl. No. 13/919,702, filed Jun. 17, 2013 Non Final Office Action dated Jun. 11, 2014, 25 pages.
U.S. Appl. No. 13/919,702, filed Jun. 17, 2013 Final Office Action dated Nov. 18, 2014, 24 pages.
U.S. Appl. No. 13/919,702, filed Jun. 17, 2013 Non-Final Office Action dated Apr. 30, 2015, 26 pages.
U.S. Appl. No. 13/919,702, filed Jun. 17, 2013 Final Office Action dated Dec. 31, 2015, 30 pages.
U.S. Appl. No. 13/919,702, filed Jun. 17, 2013 Non Final Office Action dated Jun. 30, 2016, all pages.
U.S. Appl. No. 13/919,702, filed Jun. 17, 2013 Final Office Action dated Oct. 28, 2016, all pages.
U.S. Appl. No. 13/971,579, filed Aug. 20, 2013 Non Final Office Action dated Oct. 28, 2014, 35 pages.
U.S. Appl. No. 13/971,579, filed Aug. 20, 2013 Notice of Allowance dated Feb. 27, 2015, 28 pages.
U.S. Appl. No. 14/071,613, filed Nov. 4, 2013 Non-Final Office Action dated May 18, 2015, 20 pages.

(56) References Cited

OTHER PUBLICATIONS

U.S. Appl. No. 14/071,613, filed Nov. 4, 2013 Final Office Action dated Oct. 8, 2015, 11 pages.
U.S. Appl. No. 14/139,299, filed Dec. 23, 2013, Non Final Office Action dated Aug. 14, 2015, 39 pages.
U.S. Appl. No. 14/139,299, filed Dec. 23, 2013, Final Office Action dated Feb. 25, 2016, all pages.
U.S. Appl. No. 14/139,299, filed Dec. 23, 2013, Non Final Office Action dated Jun. 20, 2016, all pages.
U.S. Appl. No. 14/139,299, filed Dec. 23, 2013, Final Office Action dated Feb. 30, 2017, all pages.
U.S. Appl. No. 14/139,420, filed Dec. 23, 2013 Non-Final Office Action dated Apr. 30, 2015, 27 pages.
U.S. Appl. No. 14/139,420, filed Dec. 23, 2013 Notice of Allowance dated Mar. 31, 2016, 37 pages.
U.S. Appl. No. 14/470,392, filed Aug. 27, 2014 Non Final Office Action dated Nov. 5, 2015, 31 pages.
U.S. Appl. No. 14/470,392, filed Aug. 27, 2014 Final Office Action dated Mar. 4, 2016, all pages.
U.S. Appl. No. 14/470,392, filed Aug. 27, 2014 Non-Final Office Action dated Aug. 5, 2016, all pages.
U.S. Appl. No. 14/470,392, filed Aug. 27, 2014, Notice of Allowance dated Feb. 13, 2017, all pages.
U.S. Appl. No. 14/470,415, filed Aug. 27, 2014 Non Final Office Action dated Nov. 18, 2015, 28 pages.
U.S. Appl. No. 14/470,415, filed Aug. 27, 2014 Final Office Action dated Mar. 3, 2016, all pages.
U.S. Appl. No. 14/470,415, filed Aug. 27, 2014 Non Final Office Action dated Jul. 29, 2016, all pages.
U.S. Appl. No. 13/030,905, filed Feb. 18, 2011, Non Final Office Action dated Feb. 15, 2013, all pages.
U.S. Appl. No. 13/030,905, filed Feb. 18, 2011, Notice of Allowance dated Jul. 16, 2013, all pages.
U.S. Appl. No. 14/136,301, filed Dec. 20, 2013, Non Final Office Action dated Jul. 9, 2015, all pages.
U.S. Appl. No. 14/136,301, filed Dec. 20, 2013, Final Office Action dated Dec. 22, 2015, all pages.
U.S. Appl. No. 14/136,301, filed Dec. 20, 2013, Notice of Allowance dated May 10, 2016, all pages.
U.S. Appl. No. 15/243,774, filed Aug. 22, 2016, Non Final Office Action dated Jan. 26, 2017, all pages.
U.S. Appl. No. 15/182,404, filed Jun. 14, 2016, Non-Final Rejection dated Jul. 20, 2017, all pages.
U.S. Appl. No. 14/470,248, filed Aug. 27, 2014, Notice of Allowance dated Aug. 8, 2017, all pages.
U.S. Appl. No. 13/942,451, filed Jul. 15, 2013 Notice of Allowance dated Aug. 7, 2017, all pages.
U.S. Appl. No. 13/919,702, filed Jun. 17, 2013 Notice of Allowance dated Aug. 10, 2017, all pages.
U.S. Appl. No. 13/919,702, filed Jun. 17, 2013, Notice of Allowance dated Aug. 10, 2017, all pages.
International Preliminary Report on Patentability for PCT/GB2015/052570 dated Mar. 7, 2017, all pages.
International Preliminary Report on Patentability for PCT/GB2015/052456 dated Feb. 28, 2017, all pages.
U.S. Appl. No. 14/981,509, filed Dec. 28, 2015, Preinterview first office action dated May 8, 2017, all pages.
U.S. Appl. No. 14/470,248, filed Aug. 27, 2014, Non-Final Office Action dated Apr. 20, 2017, all pages.
U.S. Appl. No. 13/942,451, filed Jul. 15, 2013 Final Rejection dated Apr. 19, 2017, all pages.
U.S. Appl. No. 13/919,702, filed Jun. 17, 2013 Non Final Office Action dated Apr. 28, 2017, all pages.
U.S. Appl. No. 13/834,916, filed Mar. 15, 2013 Non-Final Rejection dated Jun. 29, 2017, all pages.
U.S. Appl. No. 14/297,279, filed Jun. 5, 2014 Notice of Allowance dated May 19, 2017, all pages.
U.S. Appl. No. 14/479,007, filed Sep. 5, 2014, Non-Final Office Action dated Jun. 1, 2017, all pages.

* cited by examiner

MEDIA CONTENT CROWDSOURCE

CROSS-REFERENCE TO RELATED APPLICATIONS

This application is a continuation of U.S. application Ser. No. 14/494,079, filed Sep. 23, 2014, the entire disclosure of which is hereby incorporated by reference in its entirety for all purposes.

SUMMARY

In an aspect, a method may include or comprise receiving a request at a television receiver to transfer particular content to another or a secondary device over a broadband terrestrial communication channel, the television receiver associated with a customer account of a satellite television provider different than another customer account associated with the another device. The method may further include or comprise allocating by the television receiver a particular tuner of the television receiver to receive the particular content over a satellite communication channel. The method may further include or comprise establishing a communication connection between the television receiver and the another device in order to transfer the particular content to the another device over the broadband terrestrial communication channel.

In an aspect, a television receiver may include or comprise: at least one processor; a plurality of tuners each one communicatively coupled with the at least one processor; a broadband terrestrial communication interface communicatively coupled with the at least one processor; and at least one memory element communicatively coupled with and readable by at least one processor and having stored therein processor-readable instructions. The processor-readable instructions may, when executed by the at least one processor, cause the at least one processor to one or more of: detect receipt of a request to transfer particular content to another device over the broadband terrestrial communication interface, the television receiver associated with a customer account of a satellite television provider different than another customer account associated with the another device; allocate a particular tuner of the plurality of tuners to receive the particular content over a satellite communication channel; and establish a communication connection between the television receiver and the another device in order to transfer the particular content to the another device over the broadband terrestrial communication interface.

In an aspect, a method may include or comprise receiving a request at a television receiver to transfer particular content to another device over a broadband terrestrial communication channel, the television receiver associated with a customer account of a satellite television provider different than another customer account associated with the another device. The method may further include or comprise allocating by the television receiver a particular tuner of the television receiver to receive the particular content over a satellite communication channel. The method may further include or comprise establishing a communication connection between the television receiver and the another device in order to transfer the particular content to the another device over the broadband terrestrial communication channel. The method may further include or comprise transferring by the television receiver the particular content to the another device over the broadband terrestrial communication channel. Other aspects or implementations are possible.

DETAILED DESCRIPTION

The present disclosure is directed to or towards systems and methods for provisioning media content to computing devices that might not normally have access thereto. Example types of media or media content may include or comprise advertising media, broadcast media, social media, news media, and etc. Accordingly, it is contemplated that the principles of the present disclosure may be applicable in or to many different types of scenarios or implementations. For example, in a satellite television implementation it is not uncommon for one or more tuners of a multi-tuner television receiver to be idle at any given time. In this example, any particular idle tuner might normally be left unused until that tuner is called upon or otherwise activated to provide access to live broadcast programming, to record particular broadcast programming based upon instantiation of a recording timer, and etc. Such mismanagement or underutilization of television receiver resources is an undesirable but generally unavoidable consequence of or in typical satellite television systems. The various features or aspects of the present disclosure address this and other issues.

For example, in one embodiment, idle tuner resources may be utilized to serve content to computing devices that might not normally have access to satellite television programming. In another embodiment, a particular tuner resource may not be required to serve content to a particular computing device because it may be determined that requested content is available from or as a recording. In this example, it may be a more efficient use of resources to serve that content directly from the recording. Although not so limited, an appreciation of the various aspects of the present disclosure may be gained from the following discussion in connection with the drawings.

Figure 1:
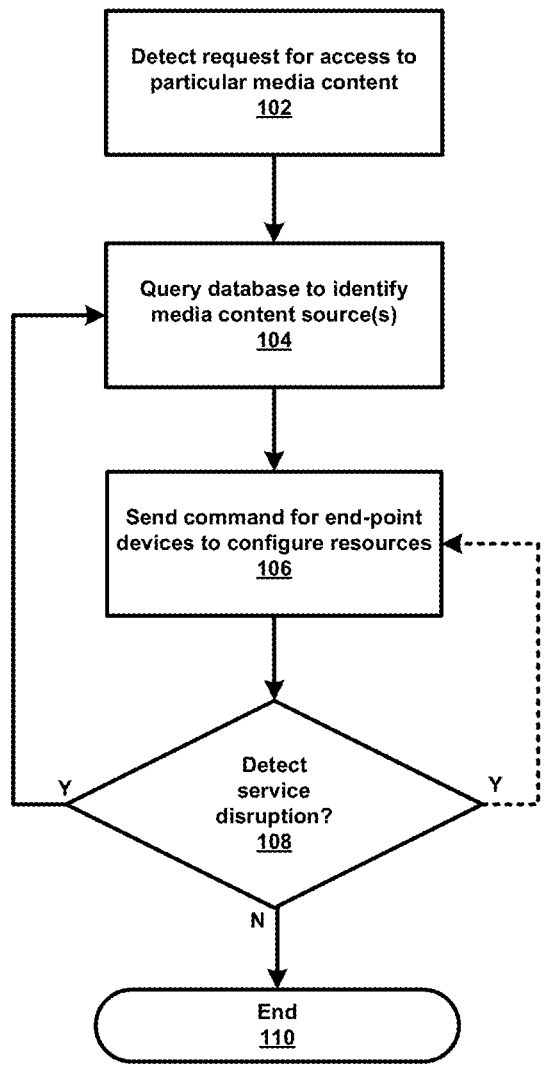
FIG. 1 shows a first example method in accordance with the disclosure.

For instance, referring now to FIG. 1, a first example method 100 is shown in accordance with the disclosure. At step 102, a server device may receive or otherwise detect a request for access to particular media content. For example, in a satellite television-related implementation, a particular user of a personal computer may use the same to request access to a particular movie that is scheduled to be broadcast via satellite at a particular time. In this example, it is contemplated that the user may not have a traditional account with a particular satellite television provider, and so does not have access to satellite television programming via what might be considered the normal channel(s), i.e., via a television receiver and outdoor satellite unit as installed at a residence of the user. Here, the personal computer is not a television receiver, and it is contemplated that a broadband-based architecture as discussed throughout may be utilized to serve the particular movie to the personal computer, despite the particular user not having the typical equipment needed for satellite television.

For example, at step 104, the server device may, in response to detecting the request for access to the particular media content at step 102, query a local and/or delocalized database to identify one or more sources that may be appropriately configurable and accessible to serve the particular media content. For example, and continuing with the implementation-specific satellite television example throughout, the server device may query a look-up table to identify at least one television receiver that has been previously enrolled or registered to take part in a service that utilizes idle tuner resources to serve content to computing devices that might not normally have access to satellite television programming. In this example, and assuming that the television receiver has access to at least one idle tuner, the server device may via broadband connection negotiate with the television receiver to allocate a particular tuner to receive the particular media content, and also to transfer the particular media content to the personal computer via broadband connection. Similarly, the server device may negotiate with the personal computer so that the data transfer may be perfected.

For example, at step 106, the server device may implement a communication sequence to command both the television receiver and the personal computer to configure respective resources so that the television receiver may serve the particular media content to the personal computer over broadband connection. For example, the server device may negotiate with the television receiver to command the same to allocate a particular tuner to receive the particular media content. The server device may further negotiate with the television receiver and the personal computer so that those respective devices may establish a broadband communication link, so that the television receiver may serve the particular media content to the personal computer over that communication link. In this manner, the server device may coordinate and instantiate the transfer of the particular media content from the television receiver to the personal computer via broadband connection. It is contemplated, however, that the role of the server device need not necessarily end once the data transfer has started.

For example, at step 108, the server device may continuously monitor the transfer of the particular media content from the television receiver to the personal computer via broadband connection. It is contemplated that this may be achieved in any of a number of different ways or manners, and any such particular manner may be implementation-specific. For example, in one embodiment, the server device may command one or both of the television receiver and the personal computer to periodically, or at least intermittently, report to the server device during data transfer to confirm that the data transfer is successfully being performed, that is, with no disruption in service. It is contemplated that a service disruption may occur due to any of a number of factors, such as service disruption due to temporary satellite service outage (e.g., due to rain fade), service disruption due to intermittent broadband connectivity, power outage at the satellite receiver, and etc.

When, at step 108, the server device determines that a service disruption of arbitrary length has occurred, or will likely occur, process flow within the example method 100 may branch to step 104, so that that the server device may establish a new, different connection between another particular television receiver and the personal computer. This loop within the example method 100 however may not necessarily occur, and in many instances a service disruption may not occur during data transfer between the television receiver and the personal computer. Accordingly, process flow within the example method 100 may branch to termination step 110 once the server device, for example, receives from one or both of the television receiver and the personal computer that the data transfer has been completed.

Many other examples of the example method 100 are possible as well. For example, during a first pass through step 104, the server device may identify a number of different television receivers that are configurable and accessible to serve the particular media content. In this example, a proactive service disruption mitigation scheme may be implemented whereby an automatic rollover to a back-up television receiver may be performed when at step 108 the server device determines that a service disruption of arbitrary length has occurred, or will likely occur. In this example, process flow within the example method 100 may branch from step 108 directly to step 106, as opposed to branching from step 108 to step 104. This is indicated in FIG. 1 by intermittent line. Still other examples are possible.

Such an implementation as discussed in connection with FIG. 1 may be beneficial in many respects and may, among other things, serve to entice new customers to subscribe to services as offered by a particular satellite television provider, as well as provide an incentive for existing customers to maintain their loyalty and/or relationship with the particular provider. Further scenarios and beneficial aspects associated with provisioning media content to devices that might normally not have access thereto are described below in connection with FIGS. 2-9.

Figure 2:
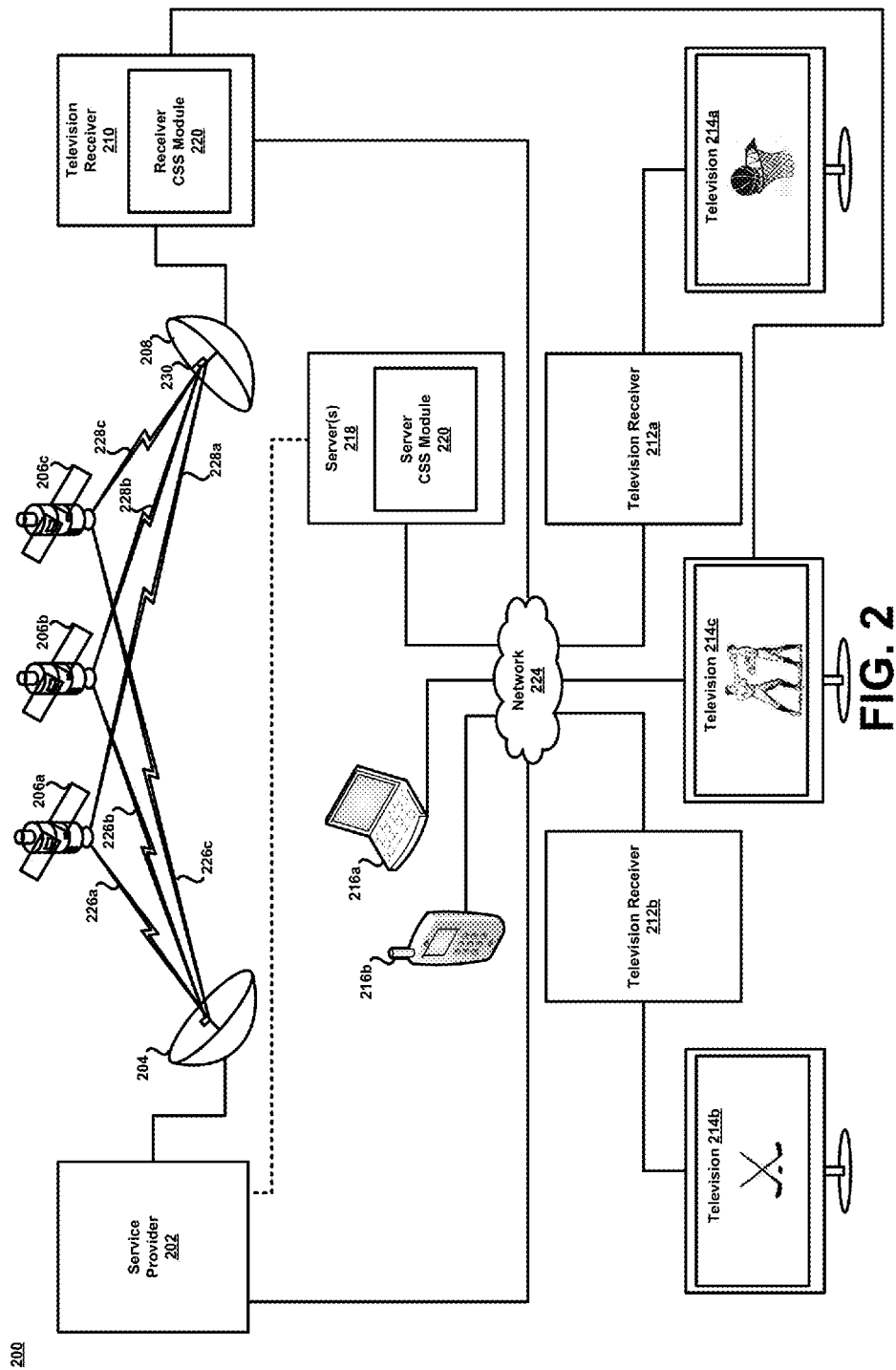
FIG. 2 shows an example satellite system in accordance with the disclosure.

Referring now to FIG. 2, an example satellite television distribution system 200 is shown in accordance with the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of distribution system as desired.

The example system 200 may include a service provider 202, a satellite uplink 204, a plurality of satellites 206*a-c*, a satellite dish 208, a PTR (Primary Television Receiver) 210, a plurality of STRs (Secondary Television Receivers) 212*a-b*, a plurality of televisions 214*a-c*, a plurality of computing devices 216*a-b*, and at least one server 218 that may be associated with the service provider 202. Additionally, the PTR 210 and/or server 218 may include a CSS (Content Sourcing Service) module 220. In general, the CSS module 220 may be configured and arranged to implement various features associated with provisioning media content to computing devices that might normally not have access thereto, as discussed throughout this disclosure.

For example, the CSS module 220 of either the PTR 210 or the server 218 may coordinate the allocation of idle tuner resources to serve content to computing devices that might not normally have access to satellite television programming. In another example, the CSS module 220 of either the PTR 210 or the server 218 may coordinate the transfer of previously recorded content, that originated via satellite broadcast, to computing devices that might not normally have access to satellite television programming. In this manner, the CSS module 220 in general may offer satellite television viewers increased flexibility and convenience with respect to the accessing of content either via their television receivers or other computing devices. Still other benefits and/or advantages are possible as well, and an appreciation of such benefits and/or advantages may be understood in light of the present disclosure in its entirety.

The system 200 may further include at least one network 224 that establishes a bidirectional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 200.

The PTR 210, and the STRs 212a-b, as described throughout may generally be any type of television receiver, television converter, etc., such as a STB for example. In another example, the PTR 210, and the STRs 212a-b, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212a-b and televisions 214a-c, and possibly the computing devices 216a-b, may each be incorporated within or form at least a portion of a particular home computing network. For instance, television 214c may have built-in a television receiver similar to STR 212b or STR 212c. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example system 200 may be configured to communicate in accordance with the MoCA® (Multimedia over Coax Alliance) home entertainment networking standard. Still other examples are possible.

In practice, the satellites 206a-c may each be configured to receive uplink signals 226a-c from the satellite uplink 204. In this example, each the uplink signals 226a-c may contain one or more transponder streams of particular data or content, such as one or more particular television channels, as supplied by the service provider 202. For example, each of the respective uplink signals 226a-c may contain various media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common. In sum, there may or might be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular television channels to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other examples are however possible.

Further, the PTR 210 may select via tuner and relay particular programming to one or both of the STRs 212a-b, which may in turn decode and then display the particular programming on a corresponding one of the televisions 214a-b. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or both of the computing device 216a-b. Similar to the above-examples, the television channel may generally be presented live, or from a recording as previously stored on the PTR 210, and may be output to one or both of the computing devices 216a-b in accordance with a particular content protection technology and/or networking standard.

Figure 3:
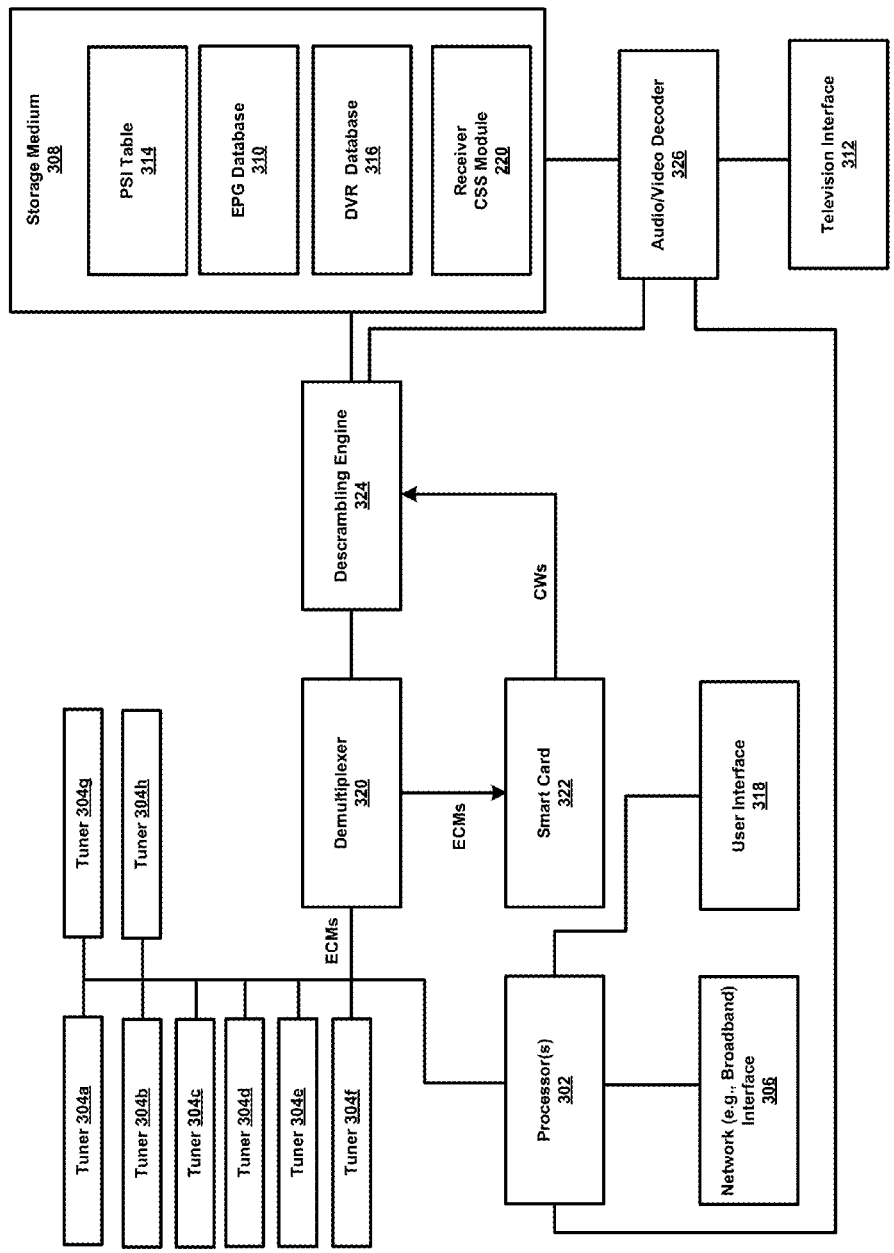
FIG. 3 shows an example block diagram of a television receiver.

Referring now to FIG. 3, an example block diagram of the PTR 210 of FIG. 2 is shown in accordance with the disclosure. In some examples, STRs 212a-b may be configured in a manner similar to that of the PTR 210. In some examples, the STRs 212a-b may be configured and arranged to exhibit a reduced functionality as compared to the PTR 210, and may depend at least to a certain degree on the PTR 210 to implement certain features or functionality. The STRs 212a-b in this example may be each referred to as a "thin client."

The PTR 210 may include one or more processors 302, a plurality of tuners 304a-h, at least one network interface 306, at least one non-transitory computer-readable storage medium 308, at least one EPG (Electronic Programming Guide) database 310, at least one television interface 312, at least one PSI (Program Specific Information) table 314, at least one DVR database 316, at least one user interface 318, at least one demultiplexer 320, at least one smart card 322, at least one descrambling engine 324, and at least one decoder 326. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 206a-c. Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, twelve tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 206a-c, which may be unidirectional to the PTR 210. Another communication channel established via the network 224 between the service provider 202 and the PTR 210 may be bidirectional. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the CSS module 220 mentioned above. Recorded television programs may be stored using the storage medium 308.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 may output a signal to a television, such as television 214c, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), a PMT (Program Management Table), etc.

Table 1 below provides a simplified example of the PSI table 314 for several television channels. It should be understood that in other examples, many more television channels may be represented in the PSI table 314. The PSI table 314 may be periodically or at least intermittently updated. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
| --- | --- | --- | --- | --- | --- |
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambled data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

For brevity, the PTR 210 is depicted in a simplified form, and may generally include more or fewer elements or components as desired, including those configured and/or arranged for implementing various features associated with intelligently allocating idle tuner resources to buffer or record broadcast programming determined as desirable, as discussed in the context of the present disclosure. For example, the PTR 210 is shown in FIG. 3 to include the CSS module 220 as mentioned above in connection with FIG. 2. While shown stored to the storage medium 308 as executable instructions, the CSS module 220 could, wholly or at least partially, be stored to the processor(s) 302 of the PTR 210. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
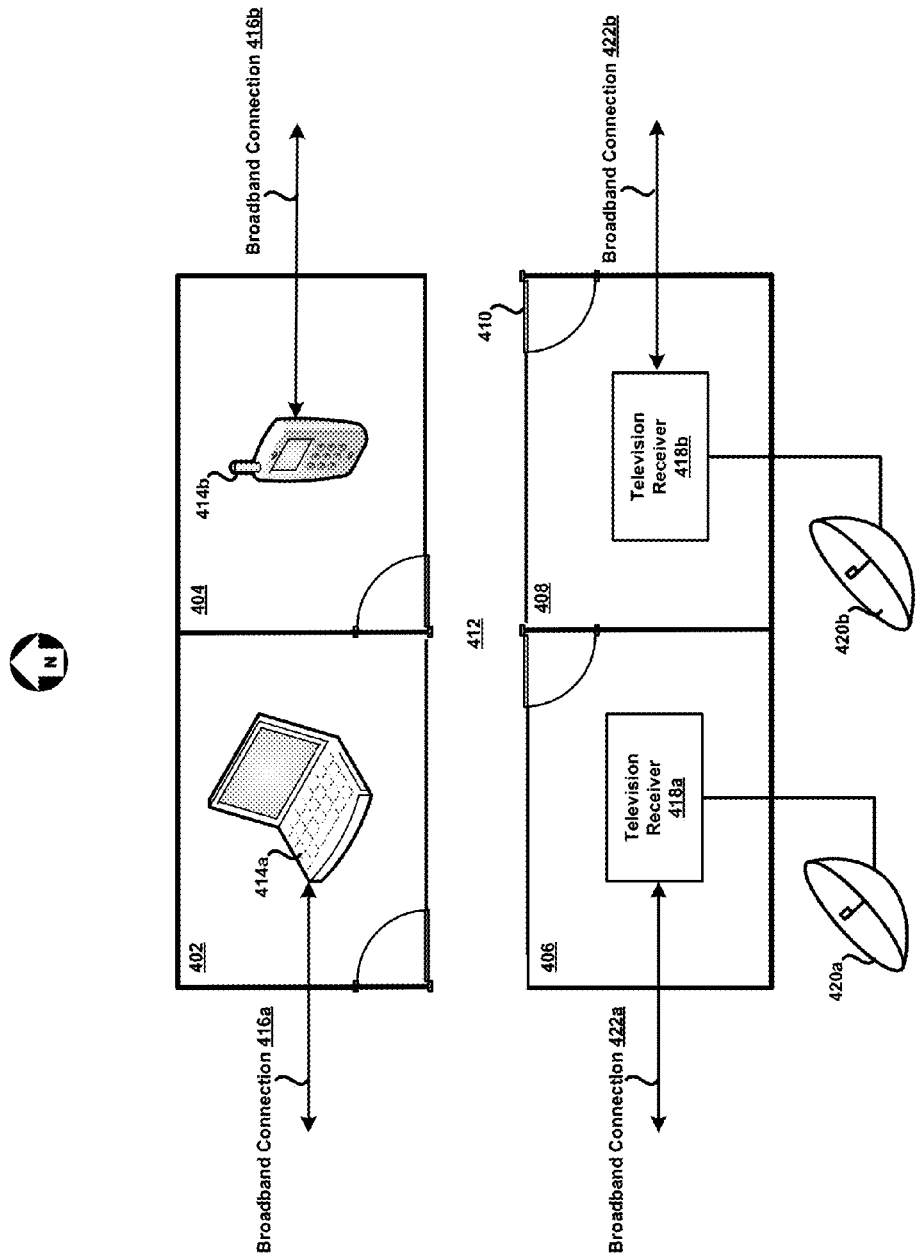
FIG. 4 shows an implementation-specific scenario in accordance with the disclosure.

Referring now to FIG. 4, an example implementation-specific architecture is shown in accordance with the present disclosure. In particular, FIG. 4 shows a simplified plan view 400 of one level of a multi-level apartment building, including a first apartment 402, a second apartment 404, a third apartment 406, and a fourth apartment 408, each accessible at least by a door 410 within a hallway 412. Other examples are possible. In the present example though, the first apartment 402 and the second apartment 404 are generally located on the North side of the apartment building, and so do not have reliable access to satellite television because any satellite dish, positioned to a respective balcony railing for example, would not be orientated towards the proper portion or section of the sky. As with most residential locations, however, the first apartment 402 and the second apartment 404 are each equipped so as to have access to the Internet via broadband connection. Accordingly, a device 414a positioned within the first apartment 402 is shown to have access to the Internet via broadband connection 416a, and a device 414b positioned within the second apartment 404 is shown to have access to the Internet via broadband connection 416b. Other examples are possible.

In contrast, the third apartment 406 and the fourth apartment 408 are located on the South side of the apartment building, and so do have access to satellite television because any satellite dish would be able to be orientated towards the proper portion or section of the sky. Accordingly, a PTR 418a positioned within the third apartment 406 is shown coupled to a satellite dish 420a, and a PTR 418b positioned within the fourth apartment 408 is shown coupled to a satellite dish 420b. Further, the PTR 418a is shown to have access to the Internet via broadband connection 422a, and the PTR 418b is shown to have access to the Internet via broadband connection 422b. Other examples are possible.

It is contemplated that the features or aspects of the present disclosure may be especially useful in scenarios such as that shown in FIG. 4. For example, it is contemplated that an individual may interact with the device 414a to request access to particular satellite programming, even though the individual does not have access to satellite television via what might be considered the normal channel(s), i.e., via a television receiver and satellite dish as shown and described in connection with the third apartment 406 and the fourth apartment 408. Such an implementation may in some examples be referred to as a "virtual" set-top-box or television receiver implementation in that the individual may interact with the device 216a itself to request and access particular television programming or content even though, as discussed throughout, the individual does not have access to satellite television via what might be considered the normal channel(s). Still further, and keeping with the context of at least FIG. 4, it will be appreciated that the individual associated with the device 216a may in many or most or all instances have a particular customer account with a business entity that operates and/or owns the service provider 202 of FIG. 2, for example, that is wholly unassociated with or separate from another particular customer account(s) associated with one or more individuals who occupy the third apartment 406 and/or the fourth apartment 408.

To continue with the example of FIG. 4, the above-mentioned request, as a message, may be transferred via broadband connection 416a to the server 218 of FIG. 2 (not shown in FIG. 4). The server 218 may, in response to detecting the request for access to the particular satellite programming, query a local and/or delocalized database to identify one or more television receivers that may be appropriately configurable and accessible to serve the particular satellite programming to the device 414a. For example, the server 218 may query a look-up table and determine that one or both of the PTR 418a and the PTR 418b have been (pre-)enrolled or (pre-)registered to take part in a service that utilizes idle tuner resources to serve content to computing devices that might not normally have access to satellite television programming. In this example, and assuming that the PTR 418a has access to at least one tuner that is currently not being used, or is in an idle state, the server 218 may via broadband connection 422a negotiate with the PTR 418a to allocate a particular tuner to receive the particular satellite programming, and also to transfer the particular satellite programming to the device 414a over broadband connection 416a. Similarly, the server 218 may negotiate with the device 414a so that the data transfer may be perfected.

For example, the server 218 may implement a communication sequence to command both the PTR 418a and the device 414a to configure respective resources so that the PTR 418a may serve the particular satellite programming to the device 414a. In particular, the server 218 may negotiate with the PTR 418a to command the PTR 418a to allocate a particular tuner to receive the particular satellite programming via satellite dish 420a. The server 218 may further negotiate with both the PTR 418a and the device 414a so that those respective devices may establish a direct communication link, to enable the PTR 418a to serve the particular satellite programming to the device 414a. In this manner, the server 218 may initiate and/or instantiate and/or coordinate the transfer of the particular satellite programming from the PTR 418a to the device 414a via broadband connection. It is though contemplated that the role of the server 218 does not necessarily end once the data transfer has started.

For example, the server 218 may continuously monitor the transfer of the particular satellite programming from the PTR 418a to the device 414a. For example, in one embodiment, the server 218 may command one or both of the PTR 418a and the device 414a to periodically, or at least intermittently, report to the server 218 during data transfer to confirm that the data transfer is successfully being performed, with no disruption in service. This example scenario may beneficial and/or advantageous in many respects. For example, satellite television may be made available to the first apartment 402 (and the second apartment 404) even though satellite television is not available to the first apartment 402 via typical or conventional means. Additionally, the typical cost or fee that might normally be incurred in making available satellite television to the first apartment 402 may be avoided, and instead may be invested in back-end resources and architecture needed to serve content over broadband connection as discussed throughout.

Still further, all of the resources and maintenance typically required to service and make available satellite television to the first apartment 402 via conventional means may be avoided. Still other benefits and/or advantages are possible as well. Additionally, other scenarios are possible, where it may be determined that a particular tuner resource is not required to serve content to a particular computing device because it may be determined that requested content is available from or as a recording, and so it may be a more efficient use of resources to serve that content directly from the recording.

For example, referring still to FIG. 4, in some examples the server 218 may, in response to detecting the request for access to the particular satellite programming, as discussed above, determine that one or both of the PTR 418a and the PTR 418b has access to a recorded instance of the particular satellite programming. In this example, the server 218 may initially implement a communication sequence to command both the PTR 418a and the device 414a to configure respective resources so that the PTR 418a may serve the recorded instance of the particular satellite programming to the device 414a. In particular, the server 218 may negotiate with the PTR 418a to command the PTR 418a to access a particular memory location in order to queue the particular satellite programming for transfer to the device 414a. Additionally, similar to that described above, the server 218 may further negotiate with the PTR 418a and the device 414a so that those respective devices may establish a direct communication link for the PTR 418a to serve the particular satellite programming to the device 414a over broadband connection. In this manner, the server 218 may coordinate and instantiate the transfer of the particular satellite broadcast programming from the PTR 418a to the device 414a.

Further, it is contemplated that data transfer from the PTR 418a to the device 414a may be or become unintentionally interrupted. In such a scenario, the server 218 may implement a process to negotiate with the PTR 418b and the device 414a to enable those respective devices to establish a direct broadband communication link, so that the device 414a is not denied access to the particular satellite broadcast programming by virtue of losing communication with the PTR 418a. In general, such redundancy or data transfer back-up may be implemented regardless of whether the particular satellite programming is accessed from a recorded instance of content or as received over-the-air by a particular tuner. In this manner, the principles of the present disclosure are also centered around the idea of crowd-sourcing, where an arbitrary first device may serve content to an arbitrary second device as desired, and in event of service disruption an algorithm may be implemented to locate or identify another, different resource that may be configured to source content to the second device.

Further, the devices such as those shown in FIG. 4 do not have to been in the same building. They can in fact be in different buildings, different cities or even different states. It may be advantageous to connect devices that are on the same broadband node so as to avoid congestion elsewhere in the network, or the Internet in general, and the server 218 and/or PTR 210 may make preferences to nearer or nearest devices, but that is not a requirement.

Figure 5:
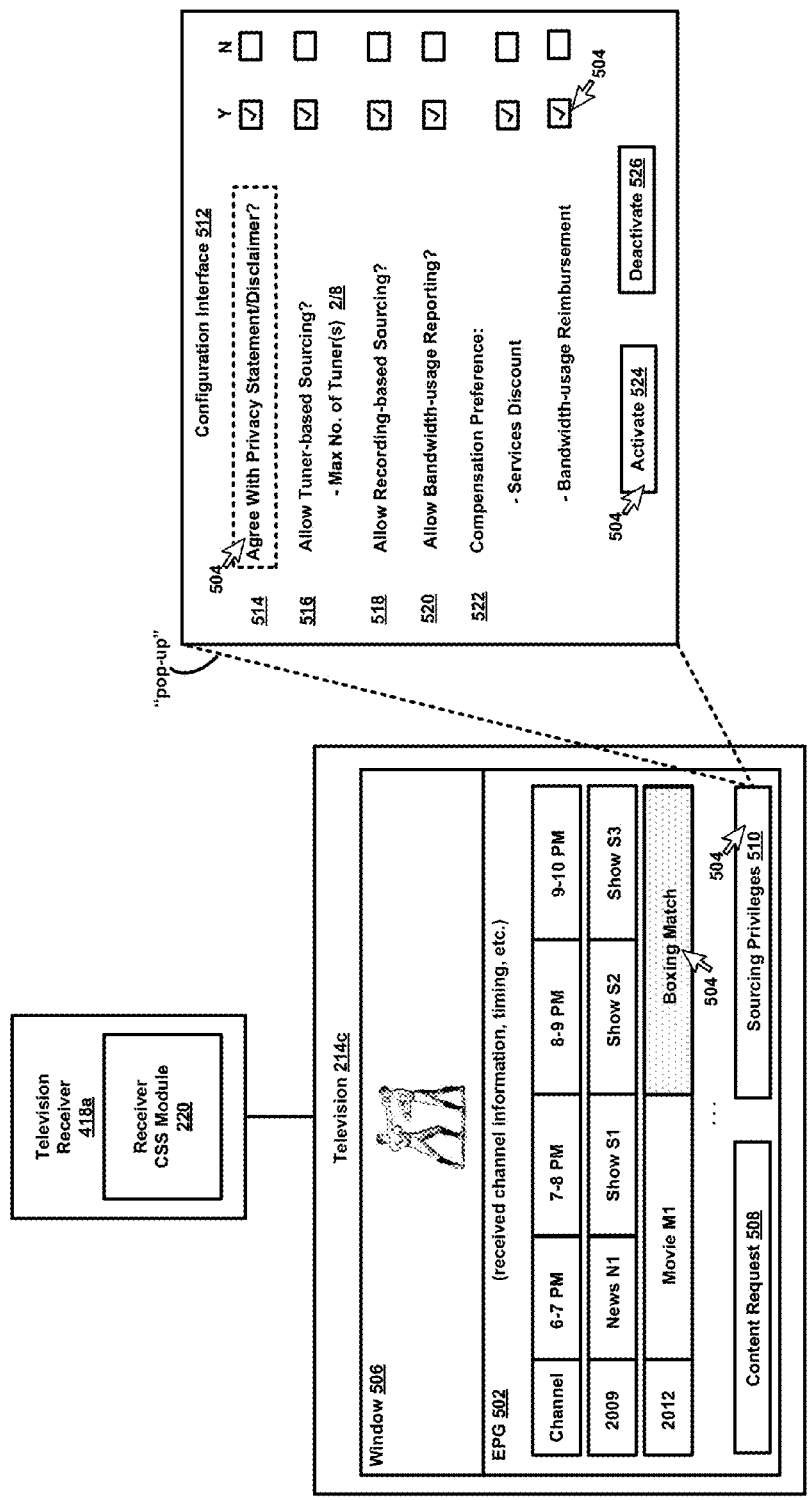
FIG. 5 shows first aspects of the example satellite system of FIG. 2 in detail.

Referring now to FIG. 5, first aspects of the example system 200 of FIG. 2 are shown in detail. In particular, the PTR 210 (see also, e.g., PTR 418a-b of FIG. 4) may be configured to output an EPG 502 to and for presentation the television 214c, for example. The EPG 502 may at least present various information related to television channels and the timing of programs or programming appearing on such television channels. For example, as shown in FIG. 5, the EPG 502 may display information associated with a channel 2012, where a Boxing Match is listed as scheduled to appear on that channel starting at a particular time on a particular day, and etc. In this example, and assuming that a current time is sometime during the time period 8-10 PM, a viewer may manipulate a cursor 504 using a pointing device (not shown) to select, as shown by stipple shading in FIG. 5, the Boxing Match for immediate viewing within a window 506 displayed by the television 214c. Other examples are possible. For example, it is contemplated that any menu-driven navigation technique or implementation may be used to enable user-interaction with the EPG 502, along with other elements or interfaces output by the PTR 210 to the television 214c.

In addition to the EPG 502, the PTR 210 may be configured to output various other interactive elements or interfaces in accordance with the disclosure. For example, the CSS module 220 may be configured to output a content request selection 508 (discussed further below in connection with FIG. 6) and a sourcing privileges selection 510. In general, the sourcing privileges selection 510 may be optionally selected to enroll or register the PTR 210 to engage or otherwise activate the CSS module 220 to take part in a service that utilizes idle tuner resources to serve content to computing devices that might not normally have access to satellite television programming according to particular user preferences. For example, a user or viewer may manipulate the cursor 504 to select the sourcing privileges selection 510, via a "point and double-click" action for example using a remote control and, in response, the CSS module 220 may be configured to output a configuration interface 512 to and for presentation by the television 214c.

In this example, the configuration interface 512 may permit a user to configure the CSS module 220 to transparently source content to computing devices that might not normally have access to satellite television programming, according to particular user preferences. For example, the configuration interface 512 may display a number of selectable options including, but not limited to: a disclaimer option 514; a tuner sourcing option 516; a recording sourcing option 518; a bandwidth monitoring option 520; and a compensation option 522. In general, at least each of those respective options as listed within the configuration interface 512 may themselves be a selectable hyperlink that when selected commands the CSS module 220 to output another interface or text-based window that provides additional, explanatory information regarding a particular selectable option.

For example, a viewer may manipulate the cursor 504 to select the disclaimer option 514, indicated by intermittent line in FIG. 5, and the CSS module 220 in turn may output a textual description detailing implications of enabling the CSS module 220 to source content to devices that might not normally have access to satellite television programming. For example, the textual description may include a privacy statement that indicates any information collected by the PTR 210 may be used to implement the various features or aspects of the present disclosure, but may not necessarily be shared with a third party, for example, and/or possibly a disclaimer that puts forth certain terms and conditions. Additionally, a "Yes" or "No" selection, or the like, may be displayed within the configuration interface 512 so that a user may have a clear, distinct opportunity to opt-in or opt-out to at least each of those respective options as listed within the configuration interface 512.

For example, a user may be afforded the opportunity to opt-in or opt-out to the services offered by the CSS module 220 by selecting the option "Yes" or "No" as shown adjacent the disclaimer option 514 in FIG. 5. Similarly, a user may be afforded the opportunity to opt-in or opt-out to allowing the CSS module 220 to allocate one or more tuners to serve content to other computing device as discussed in the context of the present disclosure, by either selecting the option "Yes" or "No" as shown adjacent the tuner sourcing option 516 in FIG. 5. Here, it is further contemplated that a user may specify a particular number of tuners associated with the PTR 210 that may be made available to the CSS module 220, such as "2/8" tuners (i.e., 2 tuners out of 8 tuners) as shown in FIG. 5.

Similarly, a user may be afforded the opportunity to opt-in or opt-out to allowing the CSS module 220 to have access to recordings stored to or by the PTR 210 (i.e., as associated with DVR functionality) in order to serve recorded content to other devices as discussed in the context of the present disclosure, by either selecting the option "Yes" or "No" as shown adjacent the recording sourcing option 518 in FIG. 5. Here, it is contemplated that in enabling this feature the user implicitly authorizes the PTR 210 to periodically or at least intermittently send information to the server 218 that identifies or specifies recordings stored to or by the PTR 210. Similarly, a user may be afforded the opportunity to opt-in or opt-out to allowing the CSS module 220 to have access to the amount of bandwidth used (e.g., uplink and/or downlink) as part of or in the process of provisioning media content to computing devices that might normally not have access thereto, as discussed throughout. In general, this information may be used to determine amount of compensation or reimbursement provided to an account associated with the PTR 210, and may be tied to the compensation option 522 in FIG. 5.

In particular, a user may be afforded the opportunity to opt-in or opt-out to one or more types of compensation or reimbursement that may be provided to an account associated with the PTR 210, as incentive for allowing the PTR 210 to participate in provisioning media content to devices that might normally not have access thereto as discussed throughout. For example, it is contemplated that a user may select "Yes" or "No" as shown adjacent a "Services Discount" selection and/or select "Yes" or "No" as shown adjacent a "Bandwidth-usage Reimbursement" selection each associated with the compensation option 522 as shown in FIG. 5. In general, the "Services Discount" selection when opted-in to may allow a particular satellite television provider to compensate or reimburse an account associated with the PTR 210 by providing a discount to one or services or channel packages as subscribed to by an individual associated with the account. For example, as compensation or reimbursement a discount of "$10/month" for the "Top 250" package may be offered.

Similarly, the "Bandwidth-usage Reimbursement" selection when opted-in to may allow a particular satellite television provider to compensate or reimburse an account associated with the PTR 210 by providing a discount based upon amount of broadband bandwidth utilized in the process of serving content in accordance with the disclosure. For example, as compensation or reimbursement a discount of "$0.01/gigabyte" may be offered. Still many other examples are possible as well, and once one or more of the respective options within the example configuration interface 512 is "checked" or selected, a user or viewer may manipulate the cursor 504 to select an activation button 524 to activate the CSS module 220, or at some arbitrary point in time select a deactivation button 526 to deactivate the CSS module 220. Further, additional or alternate implementations are possible. For example, "sharing" may only be permitted during certain hours, and/or for a certain pre-defined time period, and etc. For example, if a customer wants to make sure that they have "full" usage of their broadband connection between the hours 5-7 PM over a period of 1 week or 1 month or any other arbitrary time period, because that is when the customer mainly uses broadband to check email, browse, and etc., the customer may want to specify that he doesn't want to share during those hours and/or possibly over a particular time period. Advantageously, the customer may then not be required to on a daily basis, for example, specify that they have "full" usage of their broadband connection between the hours 5-7 PM. Many other examples are possible as well. For example, different "rules" may apply depending on the day of a week. For example, the customer may program the system so that they "full" usage of their broadband connection between the hours 5-7 PM during the period of Monday-Friday, and also program the system so that they "full" usage of their broadband connection between the hours 12 PM-7 PM during the period of Saturday-Sunday. Still many other examples are possible as well.

Figure 6:
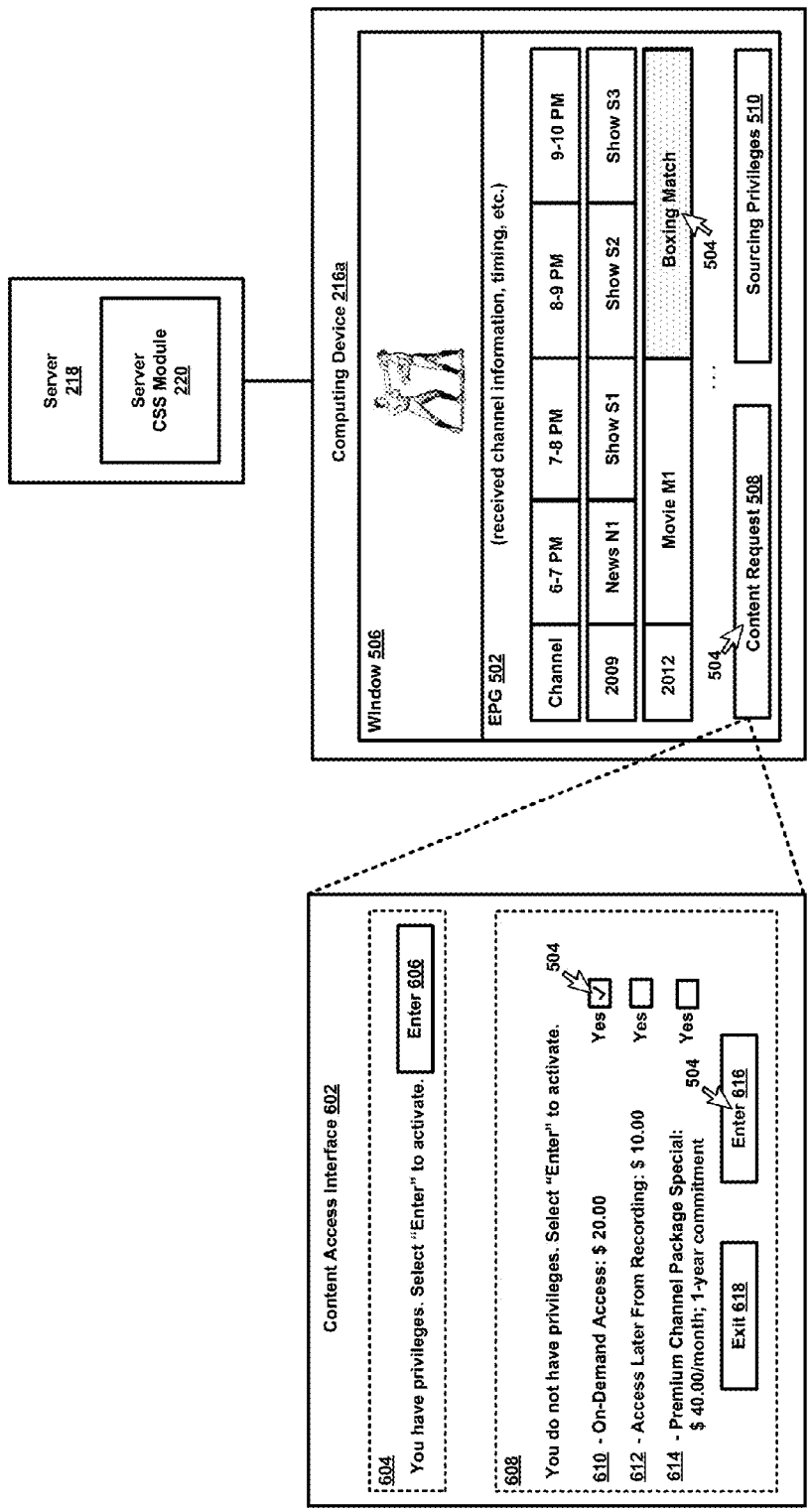
FIG. 6 shows second aspects of the example satellite system of FIG. 2 in detail.

Referring now to FIG. 6, second aspects of the example system 200 of FIG. 2 are shown in detail. In general, the features shown in FIG. 6 are similar to those discussed above in connection with FIG. 5; however, the "perspective" is different in that the aspects discussed in connection with FIG. 6 are in relation to the computing device 216a and server 218 of FIG. 2 (see also, e.g., device 414a-b of FIG. 4). As shown in FIG. 6, the server 218 may be configured to output the EPG 502 to and for presentation the computing device 216a, where the EPG 502 may at least present various information related to television channels and the timing of programs or programming appearing on such television channels. For example, as shown in FIG. 5, the EPG 502 may display information associated with the channel 2012, where the Boxing Match is listed as scheduled to appear on that channel starting at a particular time on a particular day, and etc.

In the present example though, the computing device 216a is not a television receiver, and it is contemplated that a broadband-based architecture as discussed in the context of the present disclosure may be utilized to serve the Boxing Match to the computing device 216a. For example, and assuming that a current time is sometime during the time period 8-10 PM, a viewer or user may manipulate the cursor 504 using a pointing device to select, as shown by stipple shading in FIG. 6, the Boxing Match with the intention to immediately view the Boxing Match within the window 506 as displayed by the computing device 216a. For example, following "selection" of the Boxing Match, a user may manipulate the cursor 504 to select the content request selection 508, originally mentioned above in connection with FIG. 5, and in response the CSS module 220 may be configured to output a content access interface 602 to and for presentation by the computing device 216a.

In this example, the content access interface 602 may permit a user to immediately obtain access to the Boxing Match when authorized to do so. For example, the content access interface 602 may present a first interface 604 when the CSS module 220 determines that the user requesting access to the Boxing Match is authorized to do so. This may be determined by CSS module 220 by, for example, accessing an account associated with the user and/or the computing device 216a, and identifying or confirming prior payment to access the Boxing Match, identifying or confirming prior payment to access the channel 2012 and/or a group of channels including channel 2012, e.g., as part of a "package," and etc. Subsequently, the user may manipulate the cursor 504 to select a first button 606 to immediately obtain access to the Boxing Match, as served by the PTR 210 for example in manner as discussed above. Other examples are possible.

For example, instead of the first interface 604, the content access interface 602 may present a second interface 608 when the CSS module 220 determines that the user requesting access to the Boxing Match is not authorized to do so. In this example, the second interface 608 may present any of a number of options for the user to gain access to the Boxing Match. For example, the user may be afforded the opportunity to opt-in to receive the Boxing Match via an "on-demand" service, by selecting the option "Yes" as shown adjacent to an on-demand option 610 in FIG. 6. Alternatively, the user may be afforded the opportunity to opt-in to receive the Boxing Match at a later time, following a live satellite broadcast of the Boxing Match, by selecting the option "Yes" as shown adjacent to a view later option 612 in FIG. 6. Alternatively, the user may be afforded the opportunity to sign-up for a package that includes channel 2012 by selecting the option "Yes" as shown adjacent to a premium channel option 614 in FIG. 6. Still many other examples are possible as well, and once one of the respective options within the example second interface 608 is "checked" or selected, a user may manipulate the cursor 504 to select an enter button 616 to activate the CSS module 220, so that the computing device 216a is served the Boxing Match by the PTR 210, for example, in manner as discussed above. Other examples are possible. For example, an exit button 618 may be selected so as to exit the content access interface 602 altogether so that control is reverted to the EPG 502. Additionally, other implementations are possible. For example, a "generic" service sign-up is contemplated where a potential satellite television service customer may encounter upon an advertisement on a website that might enable that individual to become a subscriber of satellite television programming even though they may not have a STB or other such typical satellite broadcast television equipment.

Figure 7:
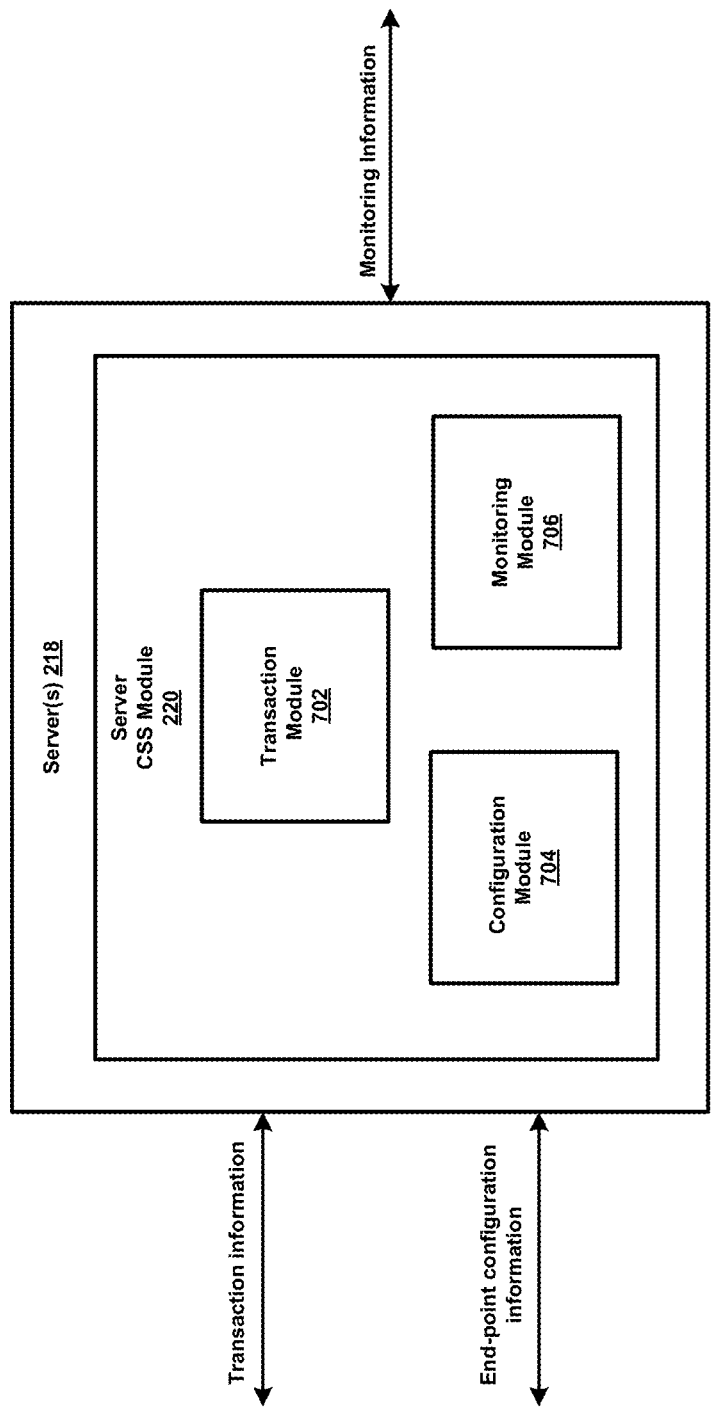
FIG. 7 shows third aspects of the example satellite system of FIG. 2 in detail.

Referring now to FIG. 7, third aspects of the example system 200 of FIG. 2 are shown in detail. In particular, the server 218 of FIG. 2 is shown where the CSS module 220 itself includes a number of modules: a transaction module 702; a configuration module 704; and a monitoring module 706. In general, the CSS module 220, and respective integral modules, is configured and arranged to implement various features associated with provisioning media content to computing devices that might normally not have access thereto, as discussed throughout this disclosure. For example, the transaction module 702 may be configured to access, keep track of, and output for display the various content of the content access interface 602 as discussed and shown above in connection with FIG. 6.

The configuration module 704 in contrast may be configured to implement a communication sequence to command television receivers (e.g., PTR 210) and personal or handheld computers (e.g., computing devices 216*a-b*) to configure respective resources so that any particular television receiver may serve particular media content to any particular device that is not a television receiver as discussed throughout the present disclosure. Last, the monitoring module 706 may continuously monitor the transfer of the particular media content from any particular television receiver to any particular device that is not a television receiver, to determine whether or not a disruption in service has or will likely occur and/or keep track of bandwidth usage, also as discussed throughout the present disclosure. Other examples are possible.

Figure 8:
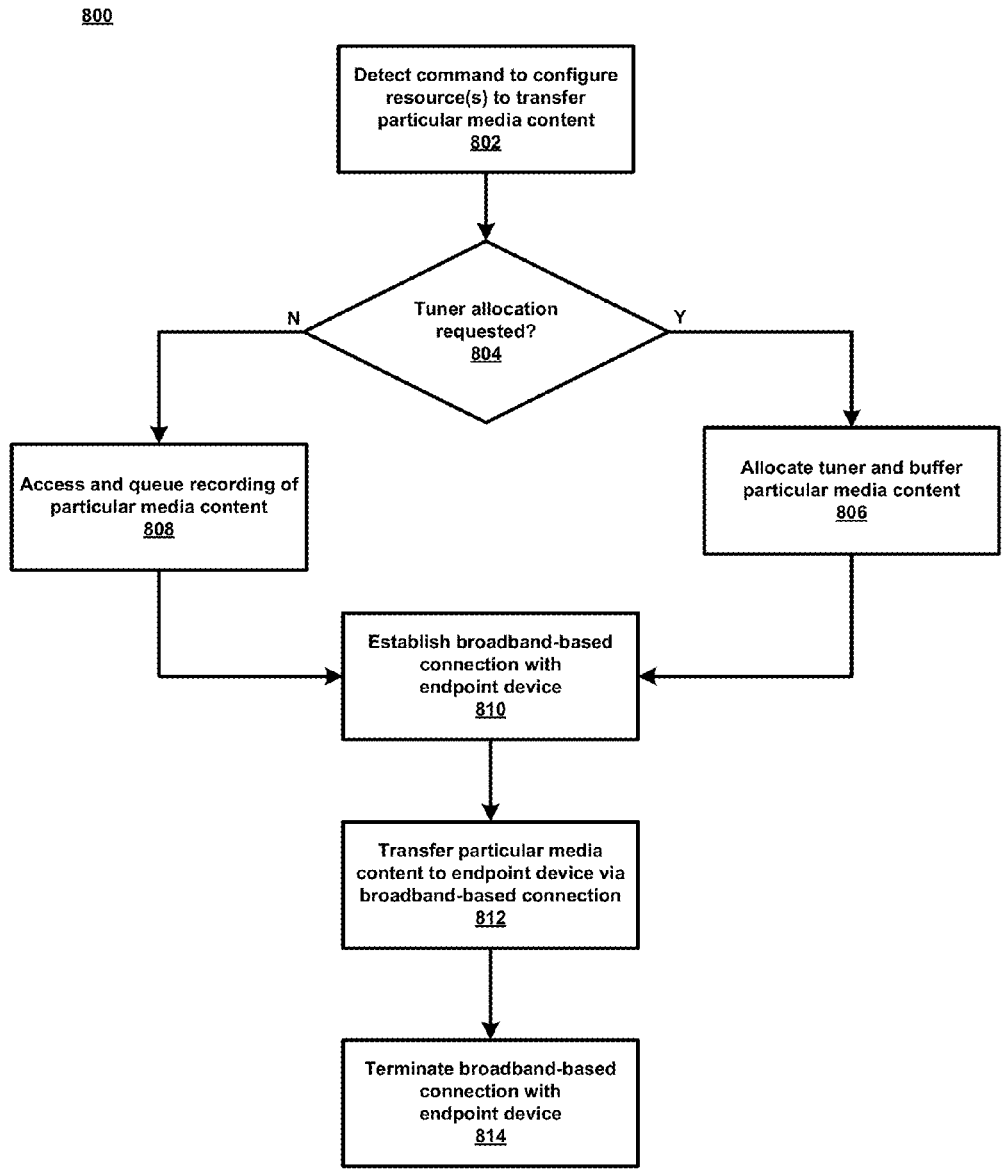
FIG. 8 shows a second example method in accordance with the disclosure.

Referring now to FIG. 8, a second example method 800 is shown in accordance with the disclosure. In general, the various steps or modules of the method 700 may be performed by the PTR 210 of FIG. 2. Other examples are possible. For example, one or more various steps or modules of the method 800 may be performed wholly or at least partially by one or more of the other devices of FIG. 2.

At step 802, the PTR 210 may detect a command to transfer particular media content to the computing device 216*b*, for example, as shown in FIG. 2. Here, the computing device 216*b* is not a television receiver, and it is contemplated that a broadband-based architecture as discussed in the context of the present disclosure may be utilized by the PTR 210 to serve the particular media content to the computing device 216*b*. In general, it is contemplated that an idle tuner resource of the PTR 210 may be allocated to receive the particular media content so that the PTR 210 may serve the particular media content to the computing device 216*b*. Alternatively, it is contemplated that particular tuner resource of the PTR 210 may not be required in order to serve the particular media content to the computing device 216*b*, because it may be determined by the PTR 210 (and/or server 218) that requested content is available from or as a recording, and so it may be a more efficient use of resources to serve that content directly from the recording. Accordingly, at step 804, the PTR 210 (and/or server 218) may make such a determination.

When at step 804 the PTR 210 (and/or server 218) determines that an idle tuner resource of the PTR 210 should be allocated to receive the particular media content so that the PTR 210 may serve the particular media content to the computing device 216*b*, process flow within the example method 800 branches to step 806. At step 806, the PTR 210 may allocate a particular tuner to receive the particular media content, and buffer the particular media content prior to transferring the same to the computing device 216*b* in a manner as discussed throughout. However, when at step 804 the PTR 210 (and/or server 218) determines that an idle tuner resource of the PTR 210 need not necessarily be allocated to receive the particular media content, because a recorded instance of the particular media content is available to the PTR 210, process flow within the example method 800 branches to step 808. At step 808, the PTR 210 may access a particular memory location in order to queue the particular media content for transfer computing device 216*b*. Following either one of step 806 and step 808, process flow within the example method 800 branches to step 810.

At step 810, the PTR 210 may, in tandem with the computing device 216*b* according to any particular protocol, establish a broadband communication link so that the PTR 210 may serve the particular media content to the computing device 216*b* over that communication link. Next, at step 812, the PTR 210 may transfer the particular media content to the computing device 216*b* over the established broadband communication link. Last, at step 814, the PTR 210 may terminate the established broadband communication link immediately following completion of the transfer the particular media content to the computing device 216*b*. Other examples are possible.

Such an implementation as discussed in connection with FIG. 8 may be beneficial in many respects. For example, a service provider may advantageously leverage STB hardware deployed in a subset of homes and/or apartments to provide service to some larger number of customers. That is, if X is the number of subscribers who have purchased a STB and installed the same in their home then a service provider could theoretically support Y total subscribers where Y=Z*X, and Z is a value greater than 1. The value Z could be determined based on the available number of tuners and the average usage of tuners by households with STB hardware. This is an advantage for the service provider in that it allows for a lower cost of acquiring subscribers, Subscriber Acquisition Cost, and also provides service(s) to customers who normally cannot acquire the same such as for physical or geographical reasons, i.e., cannot install a satellite dish such as satellite dish 208, or want only mobile access.

Figure 9:
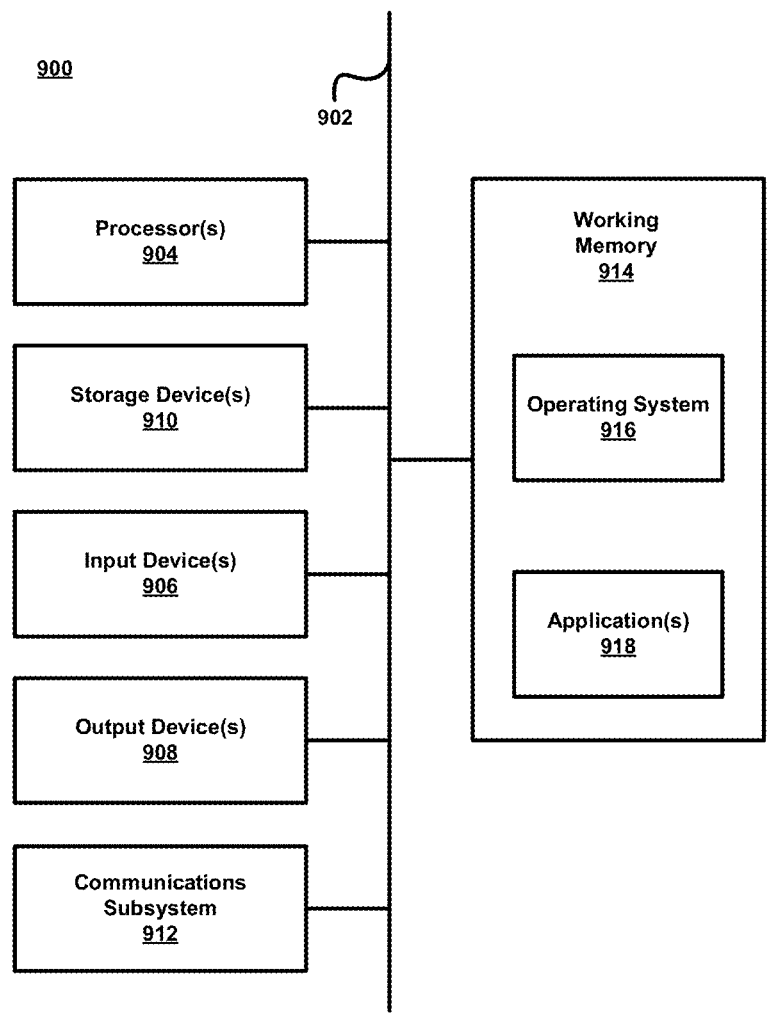
FIG. 9 shows an example computing system or device.

FIG. 9 shows an example computer system or device 900 in accordance with the disclosure. An example of a computer system or device includes an enterprise server, blade server, desktop computer, laptop computer, tablet computer, personal data assistant, smartphone, gaming console, STB, television receiver, DVD player, a streaming media player (e.g., Roku®) and/or any other type of machine configured for performing calculations. Any particular one of the previously-described computing devices may be wholly or at least partially configured to exhibit features similar to the computer system 900, such as any of the respective elements of at least FIG. 2. In this manner, any of one or more of the respective elements of at least FIG. 2 may be configured to perform and/or include instructions that, when executed, perform the method of FIG. 1 and/or the method of FIG. 8. Still further, any of one or more of the respective elements of at least FIG. 2 may be configured to perform and/or include instructions that, when executed, instantiate and implement functionality of the PTR 210 and/or the server(s) 218.

The computer device 900 is shown comprising hardware elements that may be electrically coupled via a bus 902 (or may otherwise be in communication, as appropriate). The hardware elements may include a processing unit with one or more processors 904, including without limitation one or more general-purpose processors and/or one or more special-purpose processors (such as digital signal processing chips, graphics acceleration processors, and/or the like); one or more input devices 906, which may include without limitation a remote control, a mouse, a keyboard, and/or the like; and one or more output devices 908, which may include without limitation a presentation device (e.g., television), a printer, and/or the like.

The computer system 900 may further include (and/or be in communication with) one or more non-transitory storage devices 910, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 900 might also include a communications subsystem 912, which may include without limitation a modem, a network card (wireless and/or wired), an infrared communication device, a wireless communication device and/or a chipset such as a Bluetooth™ device, 902.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 912 may permit data to be exchanged with a network (such as the network described below, to name one example), other computer systems, and/or any other devices described herein. In many examples, the computer system 900 will further comprise a working memory 914, which may include a random access memory and/or a read-only memory device, as described above.

The computer device 900 also may comprise software elements, shown as being currently located within the working memory 914, including an operating system 916, device drivers, executable libraries, and/or other code, such as one or more application programs 918, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 910 described above. In some cases, the storage medium might be incorporated within a computer system, such as computer system 900. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 900) to perform methods in accordance with various examples of the disclosure. According to a set of examples, some or all of the procedures of such methods are performed by the computer system 900 in response to processor 904 executing one or more sequences of one or more instructions (which might be incorporated into the operating system 916 and/or other code, such as an application program 918) contained in the working memory 914. Such instructions may be read into the working memory 914 from another computer-readable medium, such as one or more of the storage device(s) 910. Merely by way of example, execution of the sequences of instructions contained in the working memory 914 may cause the processor(s) 904 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 900, various computer-readable media might be involved in providing instructions/code to processor(s) 904 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 910. Volatile media may include, without limitation, dynamic memory, such as the working memory 914.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 904 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 912 (and/or components thereof) generally will receive signals, and the bus 902 then might carry the signals (and/or the data, instructions, etc. carried by the signals) to the working memory 914, from which the processor(s) 904 retrieves and executes the instructions. The instructions received by the working memory 914 may optionally be stored on a non-transitory storage device 910 either before or after execution by the processor(s) 904.

It should further be understood that the components of computer device 900 can be distributed across a network. For example, some processing may be performed in one location using a first processor while other processing may be performed by another processor remote from the first processor. Other components of computer system 900 may be similarly distributed. As such, computer device 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   outputting, by a television receiver, for presentation with a display a configuration interface, the configuration interface facilitating one or more user-selectable options to configure the television receiver;
   responsive to one or more selections received via the configuration interface, configuring the television receiver to, at a direction of a satellite television provider:
      utilize idle tuner resources to tune to one or more requested satellite communication channels,
      receive television programming via the one or more requested satellite communication channels, and
      serve the television programming to one or more arbitrary devices, detected by the satellite television provider, over one or more broadband terrestrial communication channels;
   consequent to the configuring the television receiver, receiving an access request, at the television receiver from the satellite television provider, to access particular satellite programming and transfer the particular satellite programming to a secondary device over a broadband terrestrial communication channel of the one or more broadband terrestrial communication channels, wherein:
      the television receiver is associated with a first customer account of the satellite television provider,
      the secondary device is associated with a second customer account of the satellite television provider different from the first customer account, and
      the secondary device is detected by the satellite television provider from the one or more arbitrary devices;
   receiving negotiation information, at the television receiver from the satellite television provider, to link the television receiver with the secondary device in order to serve the particular satellite programming from the television receiver to the secondary device; and
   responsive to the access request from the satellite television provider:
      determining, by the television receiver, to provide the particular satellite programming from storage of the television receiver when the particular satellite programming is accessible from storage of the television receiver;
      allocating, by the television receiver, a particular tuner of the television receiver to receive the particular satellite programming over a satellite communication channel when the particular satellite programming is not accessible from the storage of the television receiver;
   establishing a communication connection between the television receiver and the secondary device; and
   transferring the particular satellite programming to the secondary device over the broadband terrestrial communication channel.

2. The method of claim 1, further comprising:
   receiving, by the television receiver, the particular satellite programming over the satellite communication channel.

3. The method of claim 2, further comprising:
   terminating the communication connection between the television receiver and the secondary device upon completion of transfer of the particular satellite programming to the secondary device over the broadband terrestrial communication channel.

4. The method of claim 2, further comprising:
   monitoring the transfer of the particular satellite programming to the secondary device over the broadband terrestrial communication channel to identify any disruption in the transfer of the particular satellite programming to the secondary device.

5. The method of claim 1, further comprising:
   receiving, by the television receiver, a particular command to authorize transfer of content to any particular requesting device in response to receiving a particular request to transfer content over a particular broadband terrestrial communication channel by the television receiver.

6. The method of claim 1, further comprising:
   receiving, by the television receiver, a particular command to define a particular number of tuners of the television receiver to make available for receiving satellite broadcast content for transfer over a particular broadband terrestrial communication channel by the television receiver.

7. The method of claim 1, further comprising:
receiving, by the television receiver, a particular command to authorize transfer of content accessible to the television receiver from a digital video recorder for transfer over a particular broadband terrestrial communication channel by the television receiver.

8. The method of claim 1, further comprising:
receiving, by the television receiver, a particular command to authorize a particular reimbursement for credit to the first customer account associated with the television receiver in return for transfer of the particular satellite programming to the secondary device over the broadband terrestrial communication channel.

9. A television receiver, comprising:
at least one processor;
a plurality of tuners each one communicatively coupled with the at least one processor;
a broadband terrestrial communication interface communicatively coupled with the at least one processor; and
at least one memory element communicatively coupled with and readable by at least one processor and having stored therein processor-readable instructions that, when executed by the at least one processor, cause the at least one processor to:
  cause output for presentation with a display a configuration interface, the configuration interface facilitating one or more user-selectable options to configure the television receiver;
  responsive to one or more selections received via the configuration interface, configure the television receiver to, at a direction of a satellite television provider:
    utilize idle tuner resources to tune to one or more requested satellite communication channels,
    receive television programming via the one or more requested satellite communication channels, and
    serve the television programming to one or more arbitrary devices, detected by the satellite television provider, over one or more broadband terrestrial communication channels;
  consequent to the configuring the television receiver, detect receipt of an access request from the satellite television provider to access particular satellite programming and transfer the particular satellite programming to a secondary device over the broadband terrestrial communication interface, wherein:
    the television receiver is associated with a first customer account of a satellite television provider different than a second customer account associated with the secondary device, and
    the secondary device is detected by the satellite television provider from the one or more arbitrary devices;
  process negotiation information, received from the satellite television provider, to link the television receiver with the secondary device in order to serve the particular satellite programming from the television receiver to the secondary device; and
  responsive to the access request from the satellite television provider:
    determine to provide the particular satellite programming from storage of the television receiver when the particular satellite programming is accessible from storage of the television receiver; and
    allocate a particular tuner of the plurality of tuners to receive the particular satellite programming over a satellite communication channel when the particular satellite programming is not accessible from the storage of the television receiver;
    establish a communication connection between the television receiver and the secondary device; and
    transfer the particular satellite programming to the secondary device over the broadband terrestrial communication interface.

10. The television receiver of claim 9, wherein the processor-readable instructions when executed by the at least one processor cause the at least one processor to:
acquire the particular satellite programming over the satellite communication channel.

11. The television receiver of claim 10, wherein the processor-readable instructions when executed by the at least one processor cause the at least one processor to:
terminate the communication connection between the television receiver and the secondary device upon completion of transfer of the particular satellite programming to the secondary device over the broadband terrestrial communication interface.

12. The television receiver of claim 9, wherein the processor-readable instructions when executed by the at least one processor cause the at least one processor to:
detect receipt of a particular command to authorize transfer of content to any particular requesting device in response to a particular request to transfer content over a particular broadband terrestrial communication channel by the television receiver.

13. The television receiver of claim 9, wherein the processor-readable instructions when executed by the at least one processor cause the at least one processor to:
detect receipt of a particular command to define a particular number of tuners of the plurality of tuners to make available for receiving satellite broadcast content for transfer over a particular broadband terrestrial communication channel by the television receiver.

14. The television receiver of claim 9, wherein the processor-readable instructions when executed by the at least one processor cause the at least one processor to:
detect receipt of a particular command to authorize transfer of content accessible to the television receiver from a digital video recorder for transfer over a particular broadband terrestrial communication channel by the television receiver.

15. The television receiver of claim 9, wherein the processor-readable instructions when executed by the at least one processor cause the at least one processor to:
detect receipt of a particular command to authorize a particular reimbursement for credit to the first customer account associated with the television receiver in return for the transfer of the particular satellite programming to the secondary device over the broadband terrestrial communication interface.

16. A non-transitory, processor-readable media including processor-readable instructions, which, when executed by one or more processors, cause the one or more processors to perform a method comprising:
causing output for presentation with a display a configuration interface, the configuration interface facilitating one or more user-selectable options to configure a television receiver;
responsive to one or more selections received via the configuration interface, configuring the television receiver to, at a direction of a satellite television provider:
  utilize idle tuner resources to tune to one or more requested satellite communication channels, receive television programming via the one or more requested satellite communication channels, and serve the television programming to one or more arbitrary devices, detected by the satellite television provider, over one or more broadband terrestrial communication channels;

consequent to the configuring the television receiver, processing an access request, received from the satellite television provider, to access particular satellite programming and transfer the particular satellite programming to a secondary device over a broadband terrestrial communication channel of the one or more broadband terrestrial communication channels, wherein:

the television receiver is associated with a first customer account of a satellite television provider different than a second customer account associated with the secondary device, and the secondary device is detected by the satellite television provider from the one or more arbitrary devices;

processing negotiation information, received from the satellite television provider, to link the television receiver with the secondary device in order to serve the particular satellite programming from the television receiver to the secondary device; and responsive to the access request from the satellite television provider:

determining, by the television receiver, to provide the particular satellite programming from storage of the television receiver when the particular satellite programming is accessible from storage of the television receiver; and allocating, by the television receiver, a particular tuner of the television receiver to receive the particular satellite programming over a satellite communication channel when the particular satellite programming is not accessible from the storage of the television receiver;

establishing a communication connection between the television receiver and the secondary device in order to transfer the particular satellite programming to the secondary device over the broadband terrestrial communication channel; and causing transfer of the particular satellite programming to the secondary device over the broadband terrestrial communication channel.

* * * * *